(12) United States Patent  
Diba

(10) Patent No.: US 9,564,049 B2  
(45) Date of Patent: Feb. 7, 2017

(54) ELECTRONIC TRAFFIC ALERT SYSTEM

(71) Applicant: Keyvan T. Diba, Los Angeles, CA (US)

(72) Inventor: Keyvan T. Diba, Los Angeles, CA (US)

(73) Assignee: Traffic Emergency Displays, Inc., Los Angeles, CA (US)

( * ) Notice: Subject to any disclaimer, the term of this patent is extended or adjusted under 35 U.S.C. 154(b) by 645 days.

(21) Appl. No.: 14/010,410

(22) Filed: Aug. 26, 2013

(65) Prior Publication Data

US 2014/0118553 A1   May 1, 2014

Related U.S. Application Data

(60) Provisional application No. 61/692,804, filed on Aug. 24, 2012.

(51) Int. Cl.
| | |
|---|---|
| *G08G 1/09* | (2006.01) |
| *G08G 1/095* | (2006.01) |
| *G08G 1/087* | (2006.01) |
| *G08G 1/097* | (2006.01) |
| *B60Q 1/00* | (2006.01) |

(52) U.S. Cl.
CPC .............. *G08G 1/095* (2013.01); *G08G 1/087* (2013.01); *G08G 1/097* (2013.01); *B60Q 1/00* (2013.01); *B60Q 2200/00* (2013.01)

(58) Field of Classification Search
CPC ............................. B60Q 1/00; B60Q 2200/00
See application file for complete search history.

(56) References Cited

U.S. PATENT DOCUMENTS

| | | | |
|---|---|---|---|
| 2,850,717 A | 9/1958 | Wiswell | |
| 3,484,973 A | 12/1969 | Evenson | |
| 4,704,610 A | 11/1987 | Smith | |
| 4,775,865 A | 10/1988 | Smith | |
| 5,172,113 A | 12/1992 | Hamer | |
| 5,539,398 A | 7/1996 | Hall | |
| 5,917,431 A | 6/1999 | Sanada | |
| 6,940,422 B1* | 9/2005 | Bachelder | G08G 1/087 340/906 |
| 7,113,108 B1 | 9/2006 | Bachelder | |
| 7,375,650 B2 | 5/2008 | Lo | |
| 7,538,687 B2 | 5/2009 | McKenna | |
| 7,884,738 B2 | 2/2011 | Pappas | |
| 8,111,208 B2 | 2/2012 | Brown | |
| 2002/0134423 A1 | 9/2002 | Eller | |
| 2004/0145497 A1* | 7/2004 | Pearson | G08G 1/07 340/906 |

(Continued)

*Primary Examiner* — Shirley Lu
(74) *Attorney, Agent, or Firm* — Edwin Tarver, Esq.; Lauson & Tarver LLP

(57) ABSTRACT

A traffic control system includes a traffic display for installation near or adjacent existing street signage, which illuminates the signage and displays messages relating to traffic conditions including emergency conditions or the approach of an emergency vehicle. The traffic display is associated with a camera unit, which provides redundant confirmation with a central traffic control that the display is operating correctly, and displaying the message communicated to central traffic control or at its direction. The traffic control system advises drivers of changing traffic conditions in real time, provides control of the system from central traffic control, and allows central traffic control to monitor the functioning of the traffic display.

20 Claims, 23 Drawing Sheets

(56) References Cited

U.S. PATENT DOCUMENTS

| | | | |
|---|---|---|---|
| 2005/0222769 A1* | 10/2005 | Simon | G06F 7/00 |
| | | | 701/300 |
| 2007/0000849 A1 | 1/2007 | Lutz | |
| 2010/0238090 A1 | 9/2010 | Pomerantz | |
| 2011/0182473 A1* | 7/2011 | Wang | G08G 1/04 |
| | | | 382/103 |
| 2011/0199231 A1* | 8/2011 | Loiselle | G09F 9/33 |
| | | | 340/907 |
| 2012/0206050 A1* | 8/2012 | Spero | B60Q 1/04 |
| | | | 315/152 |

\* cited by examiner

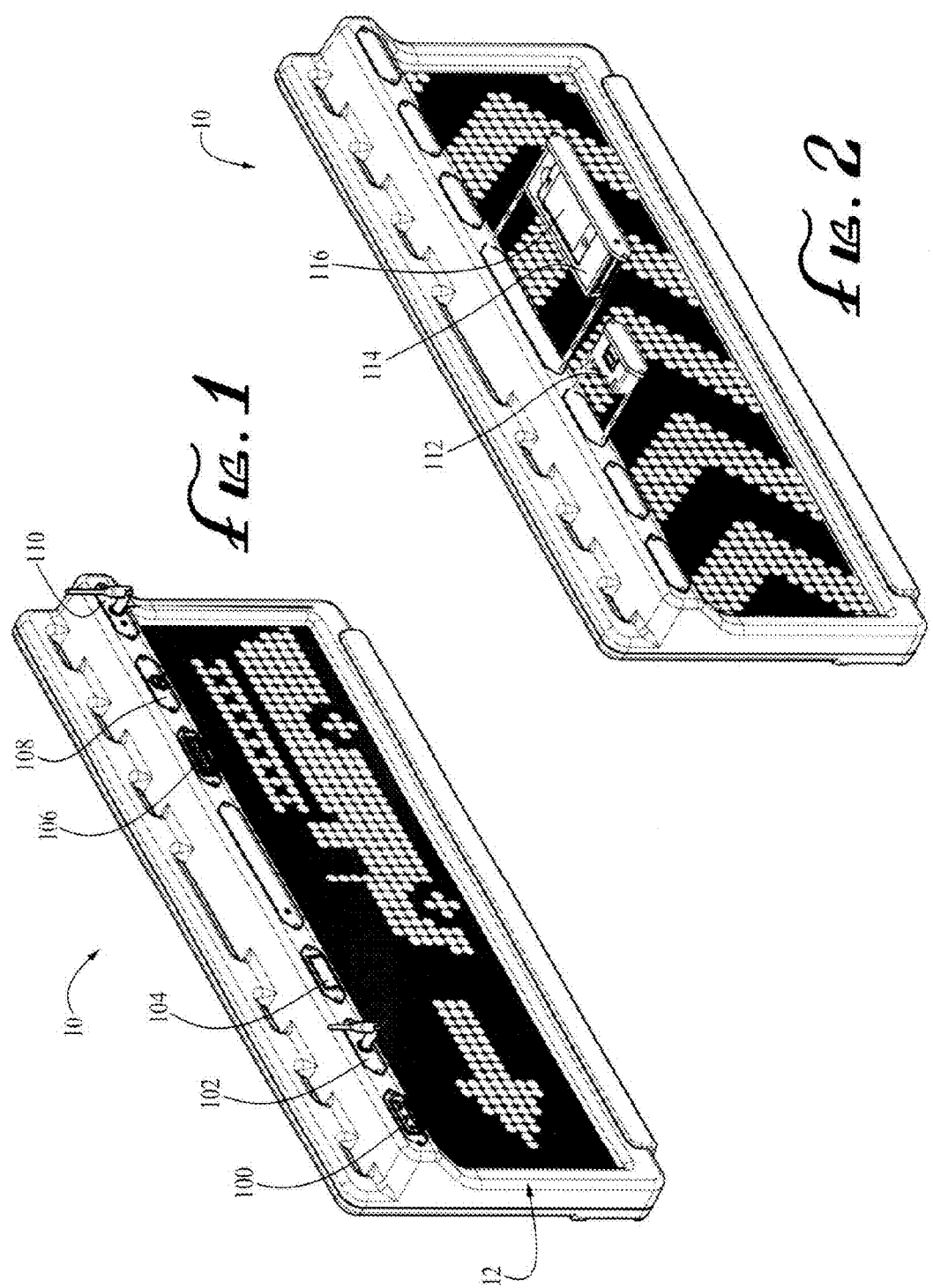

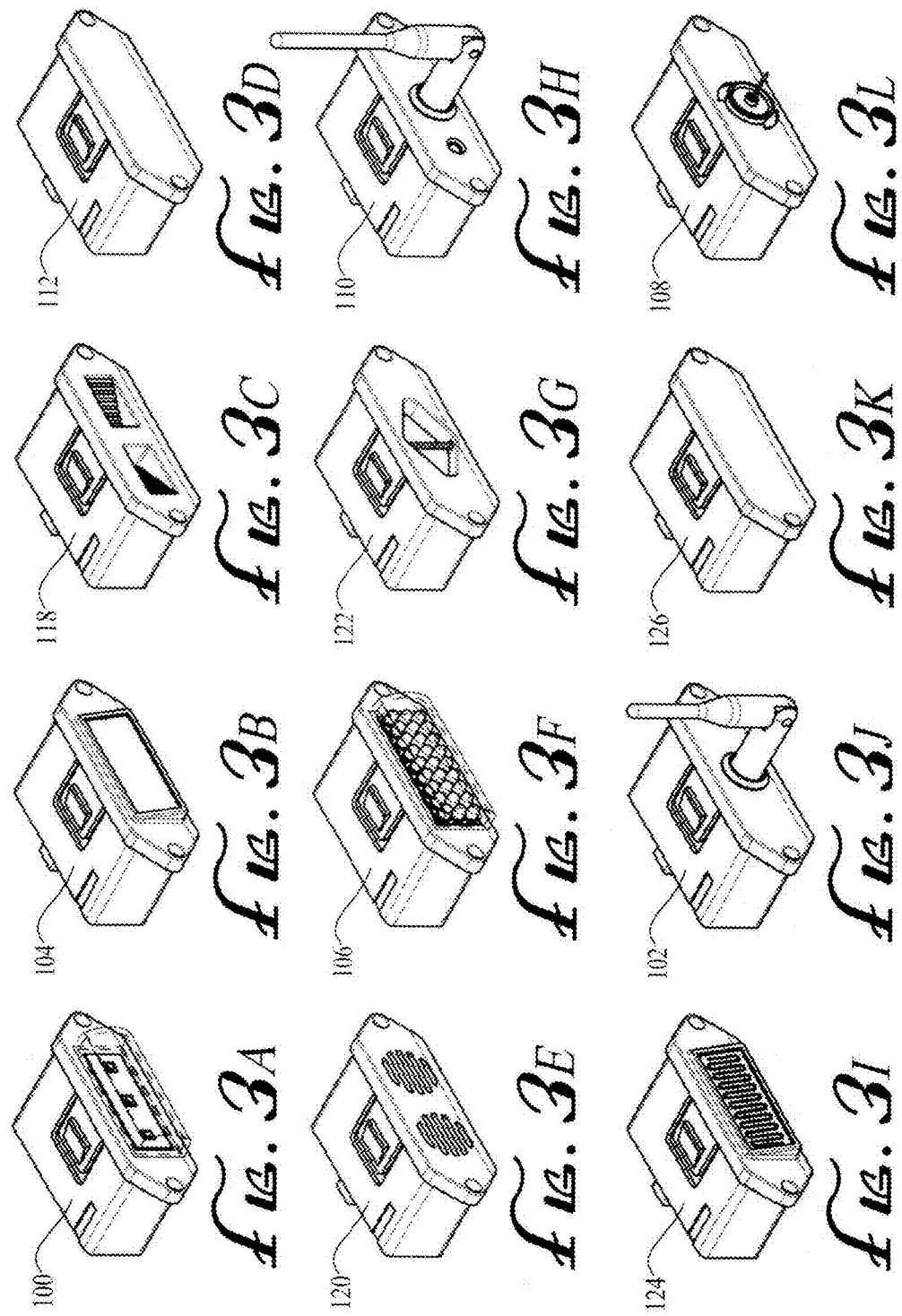

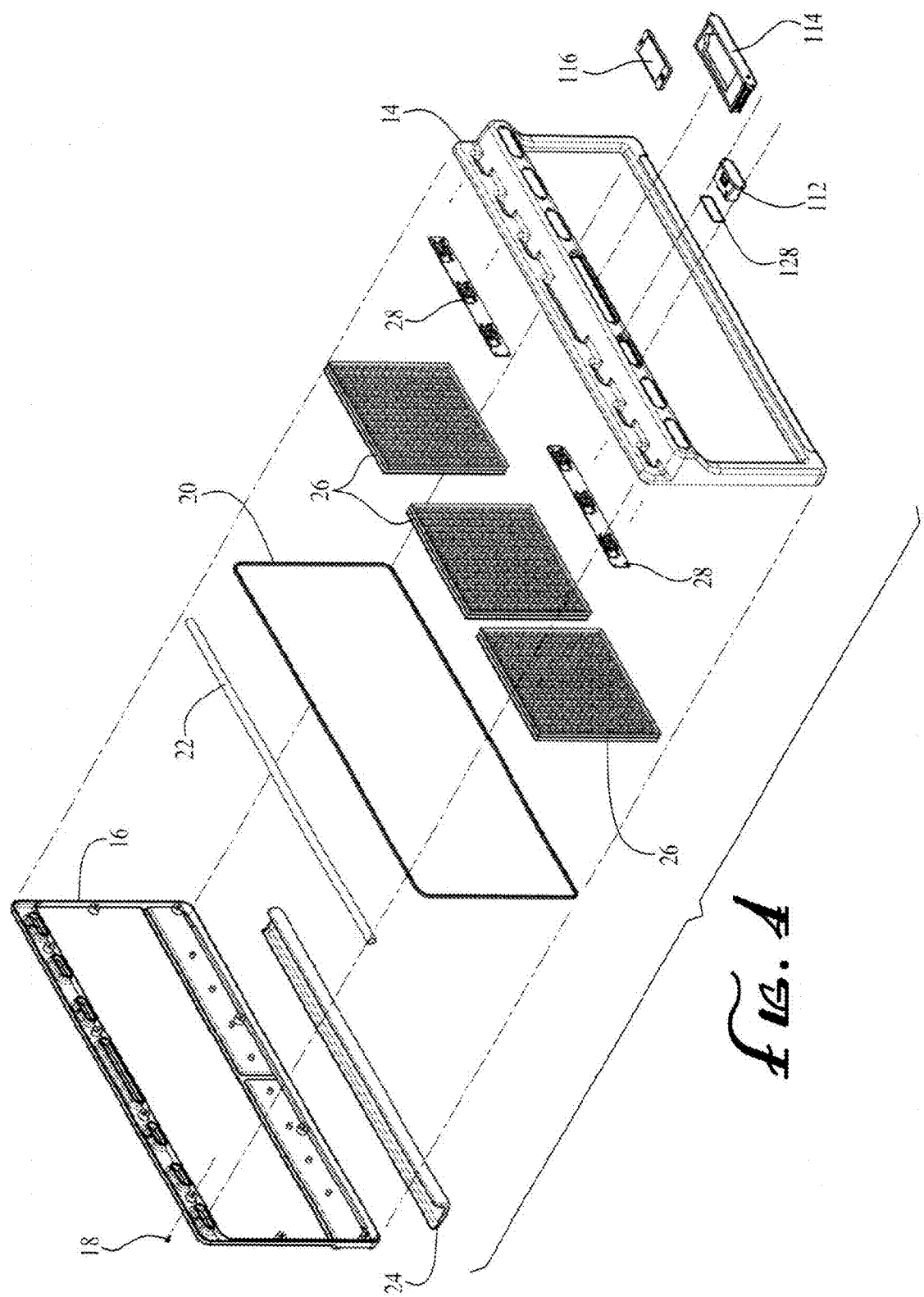

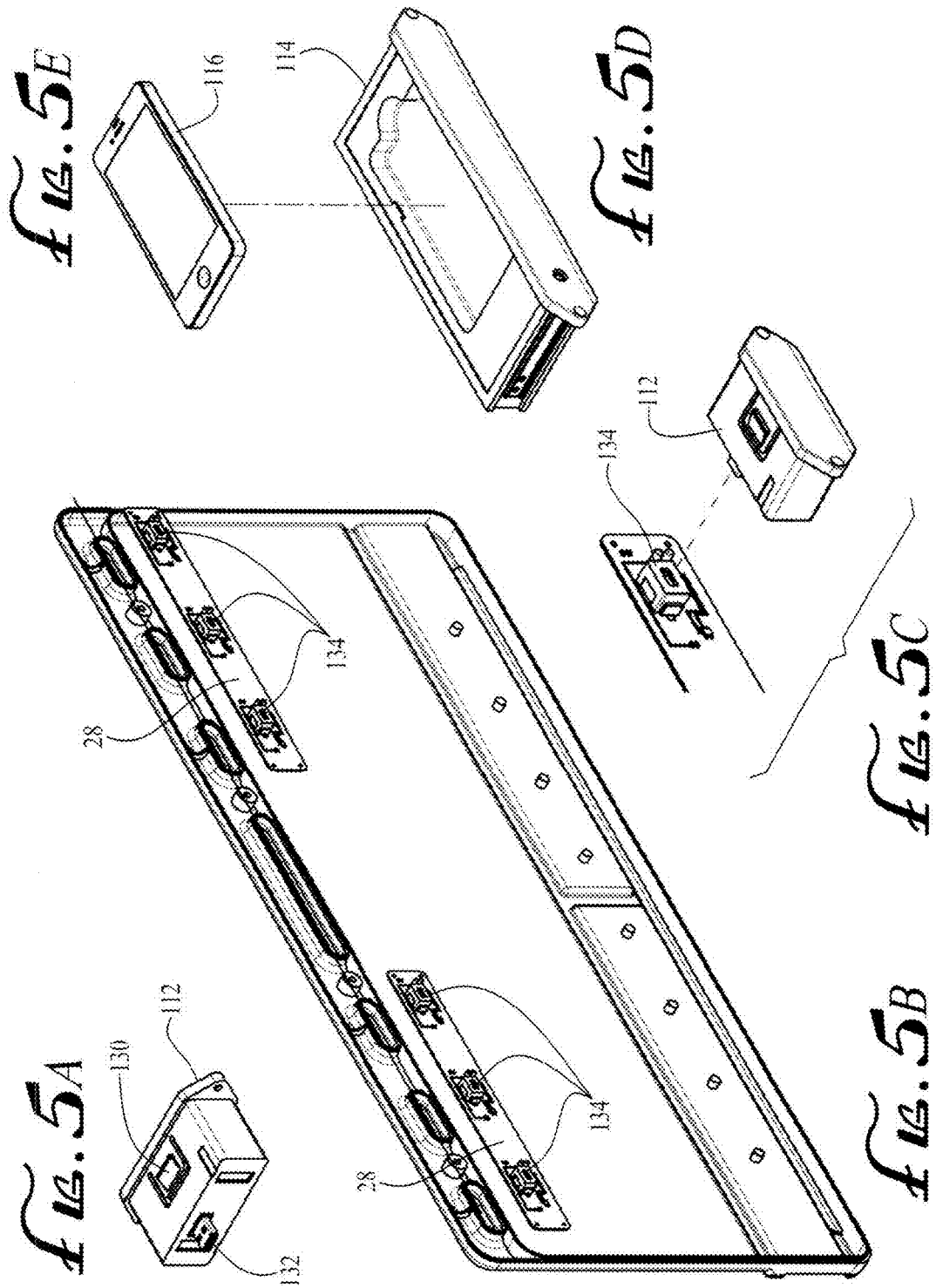

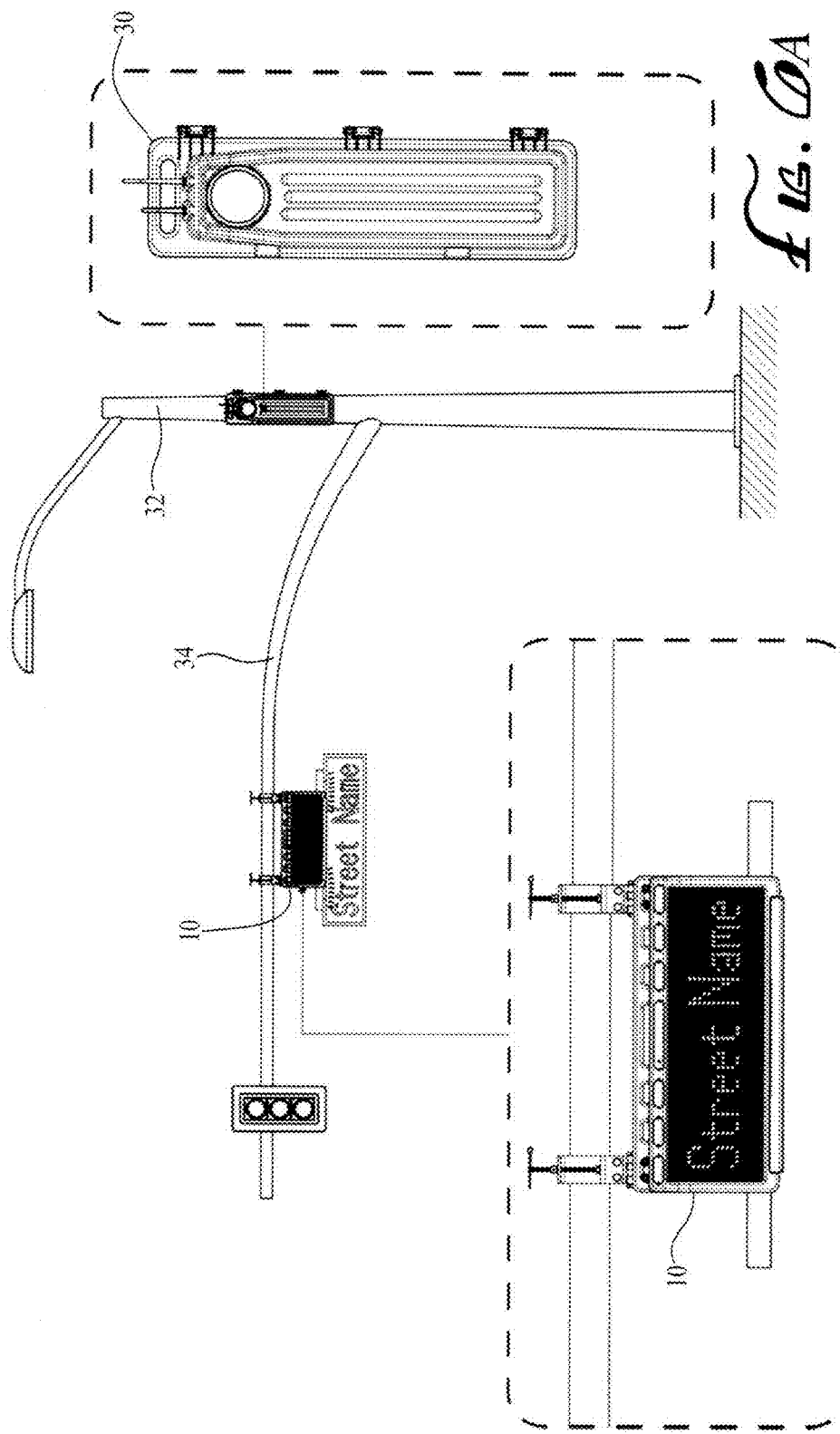

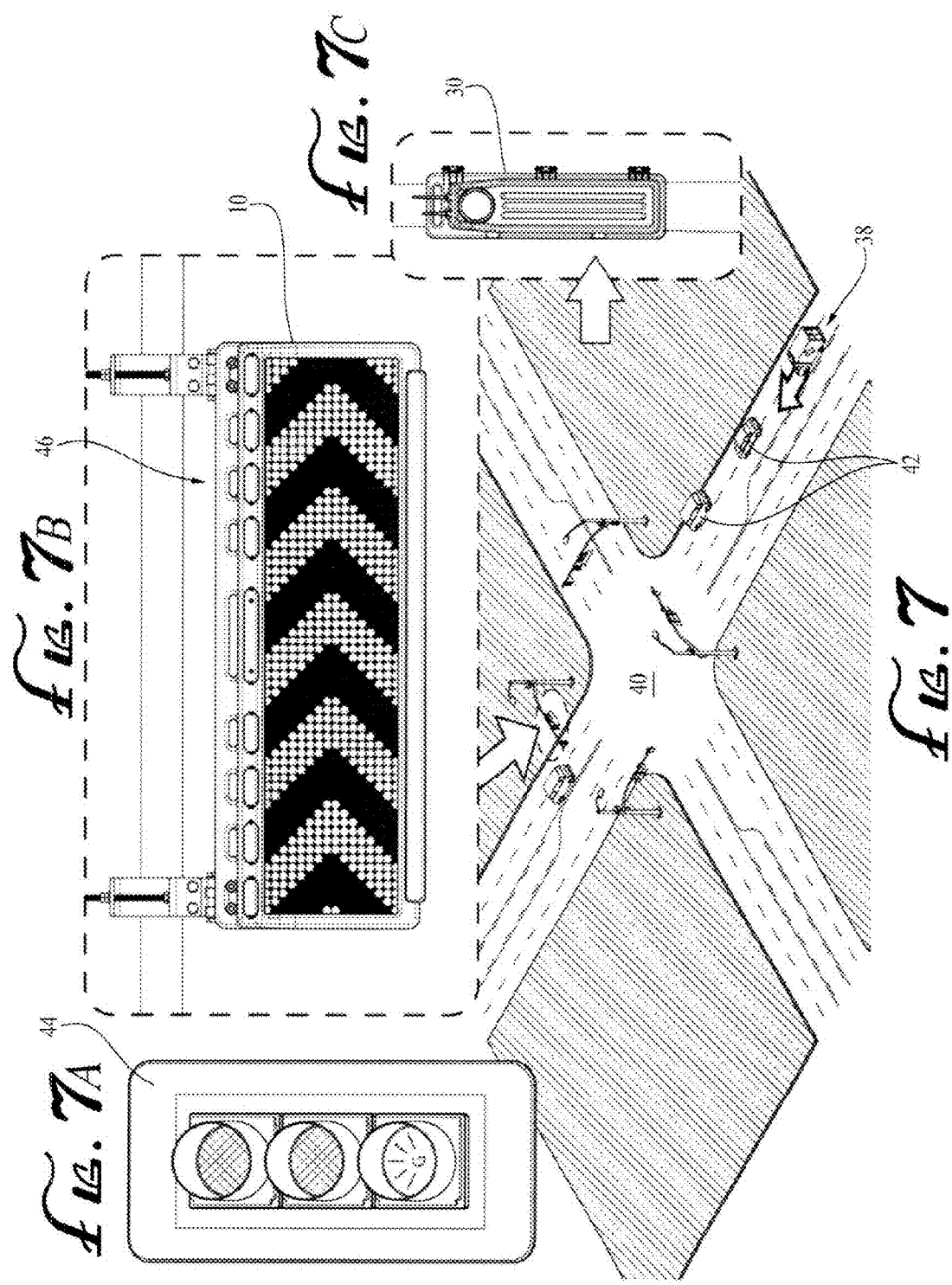

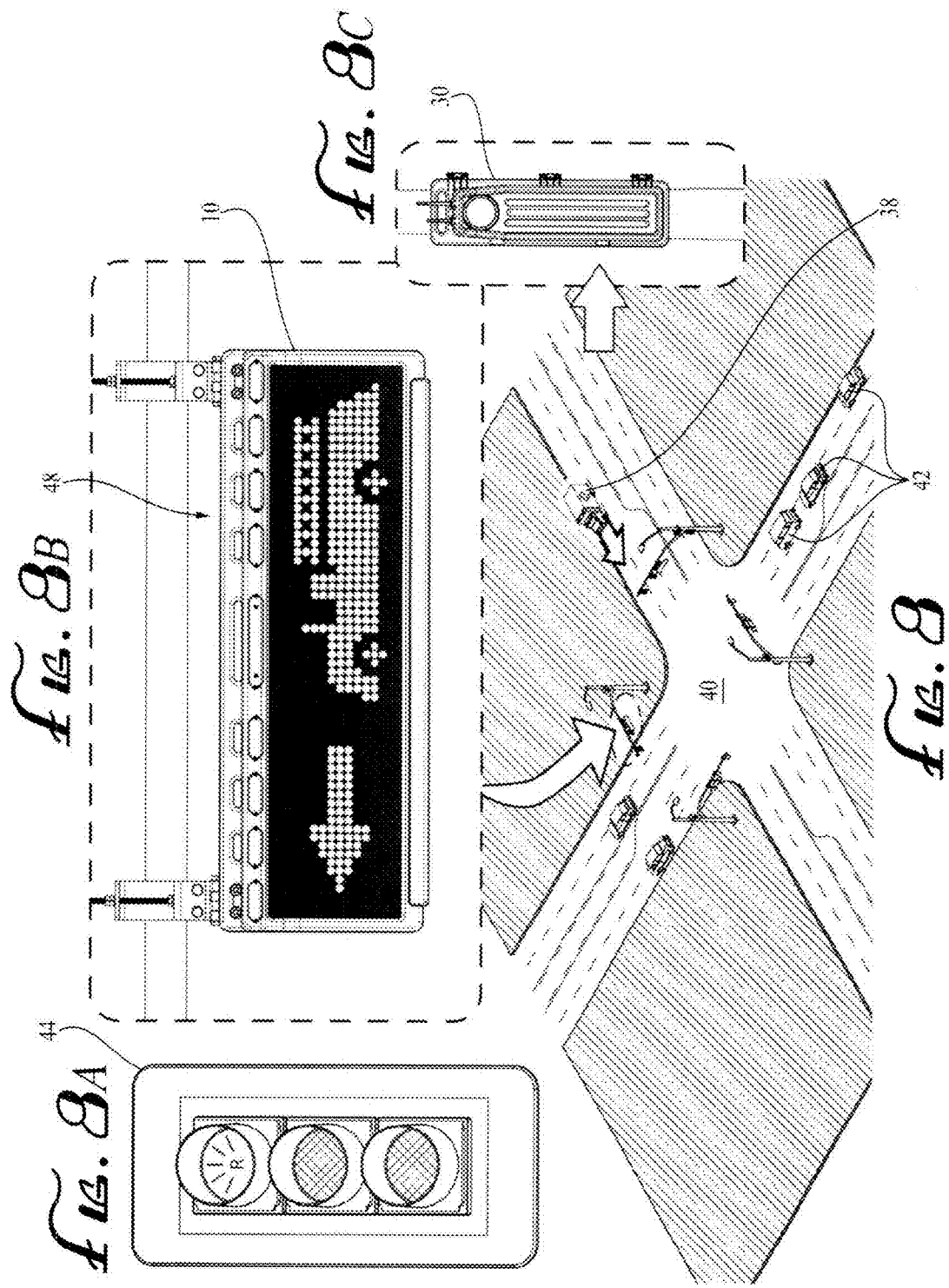

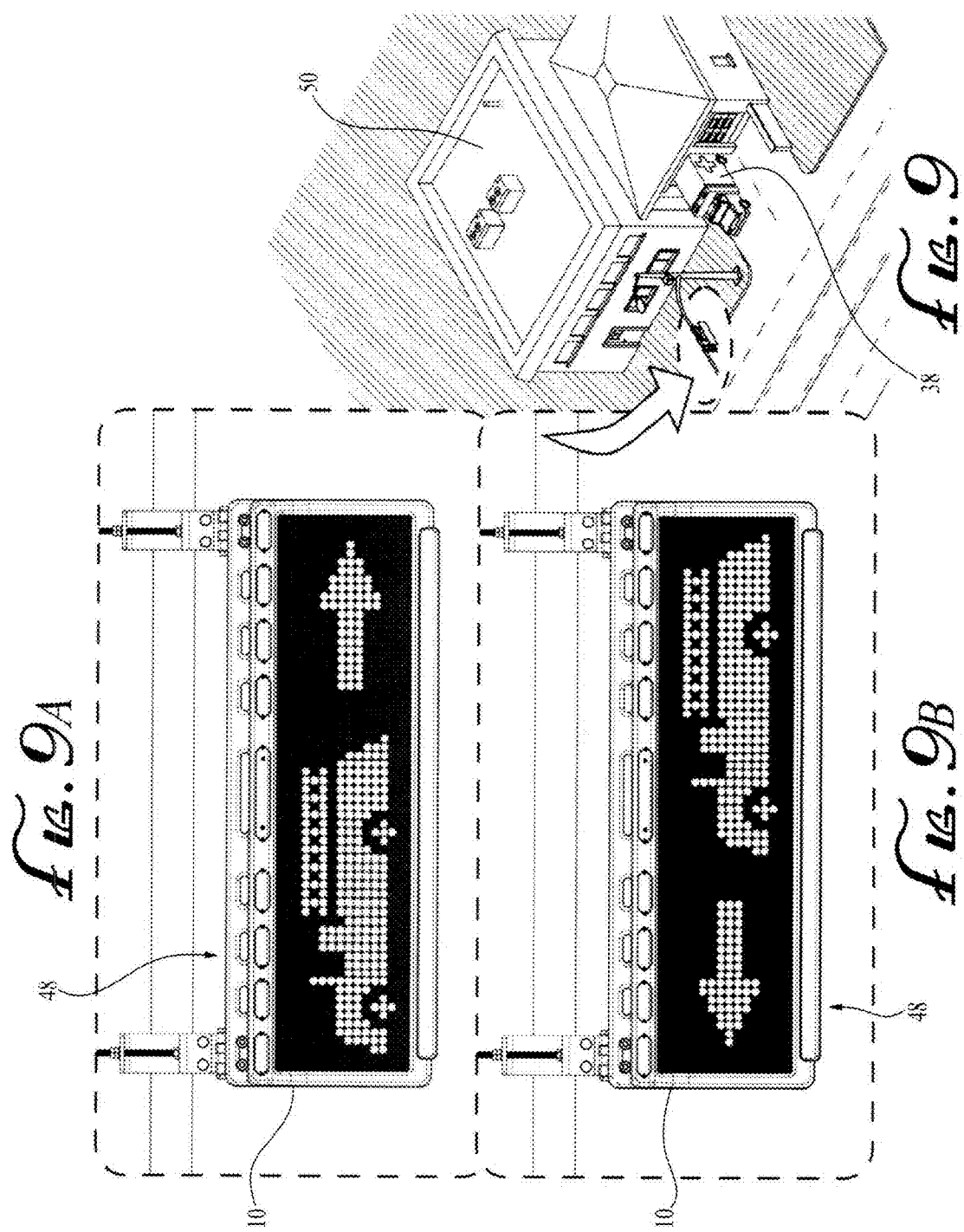

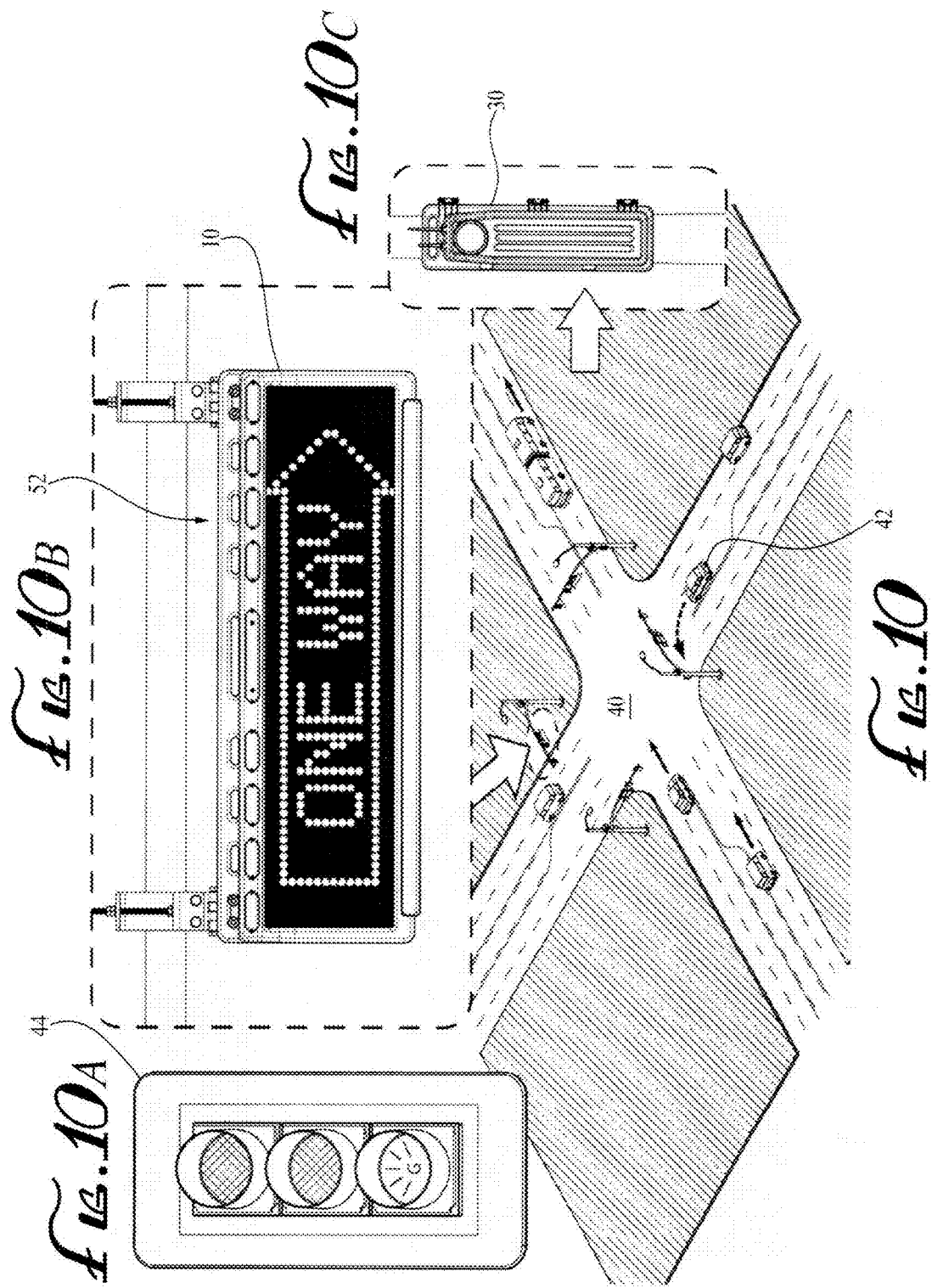

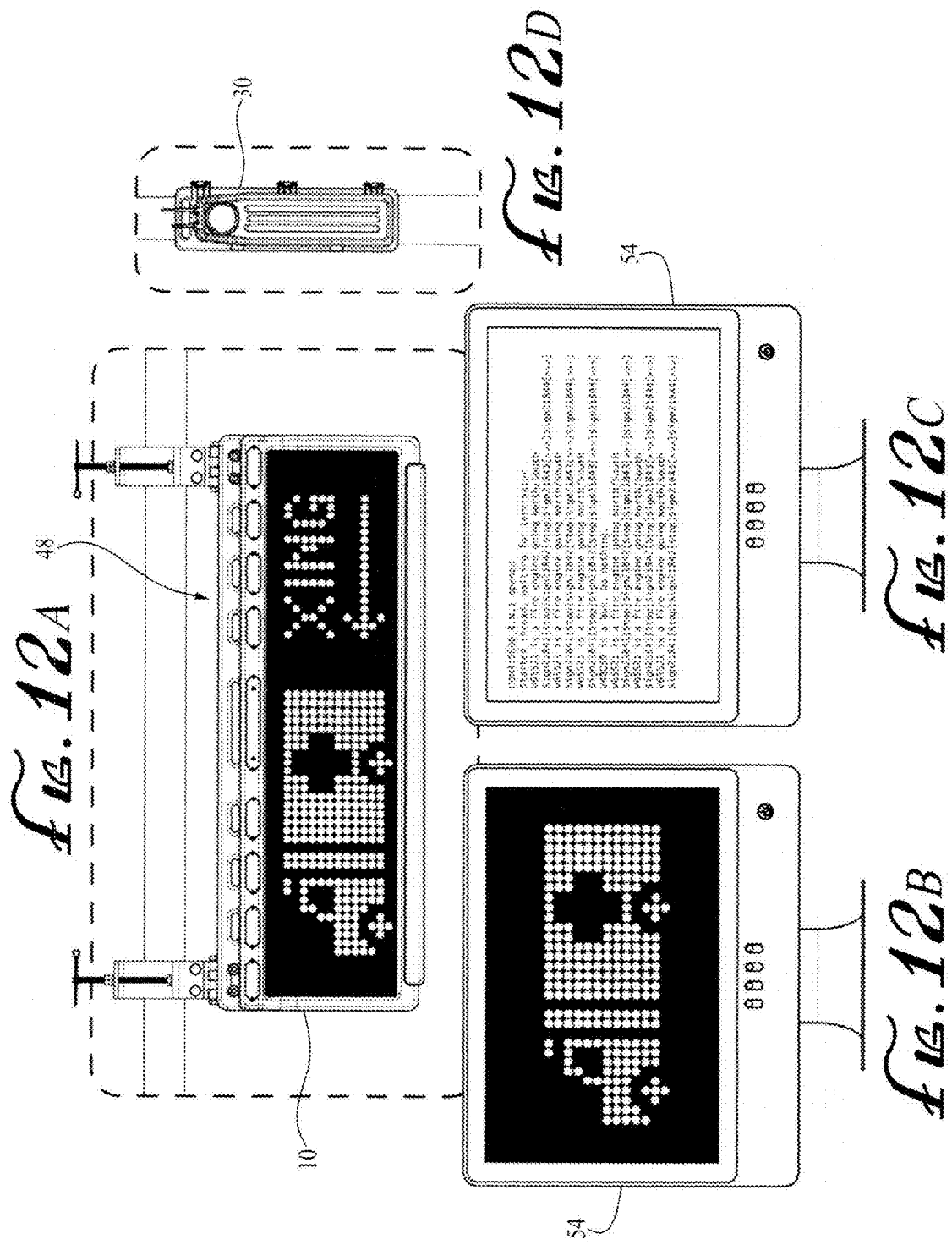

Fig. 13

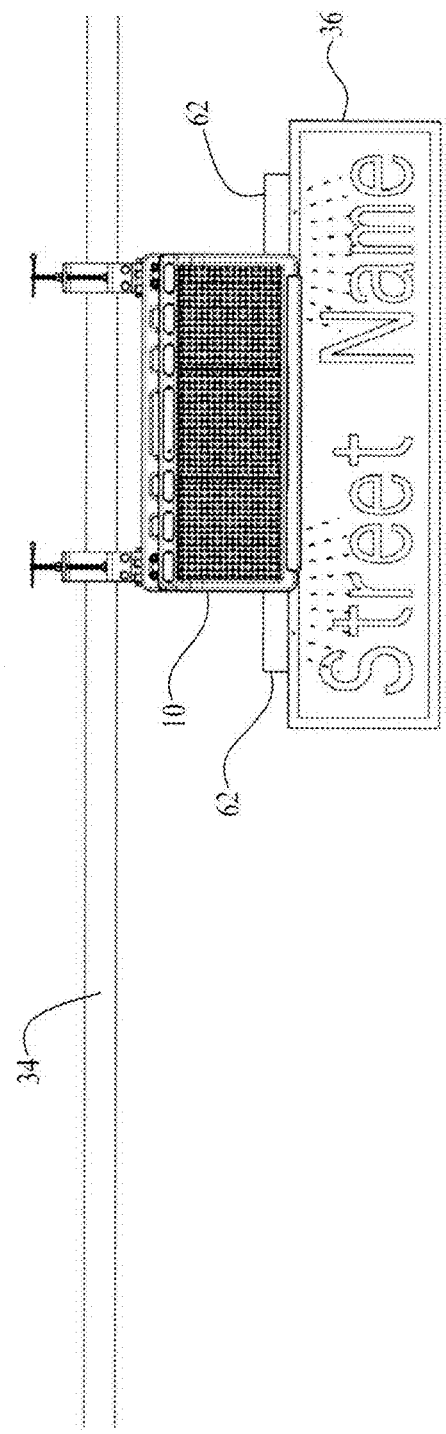
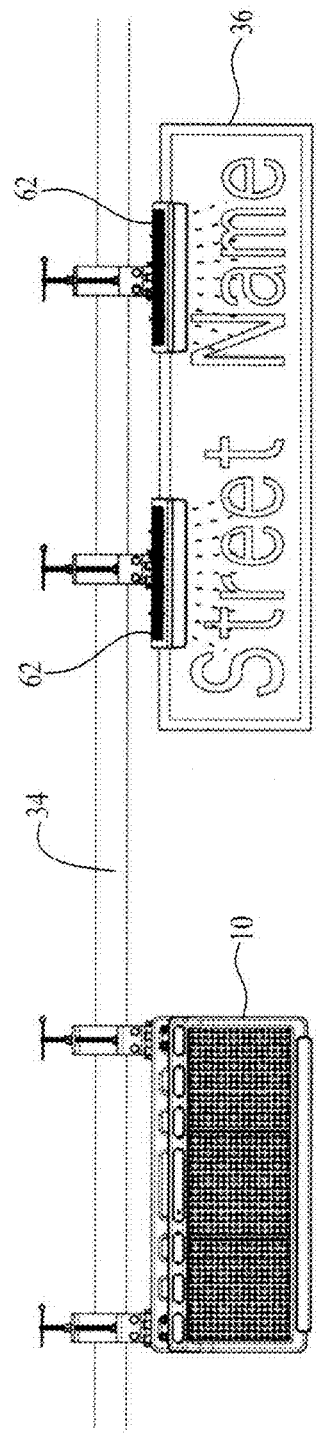
Fig. 14A
Fig. 14B

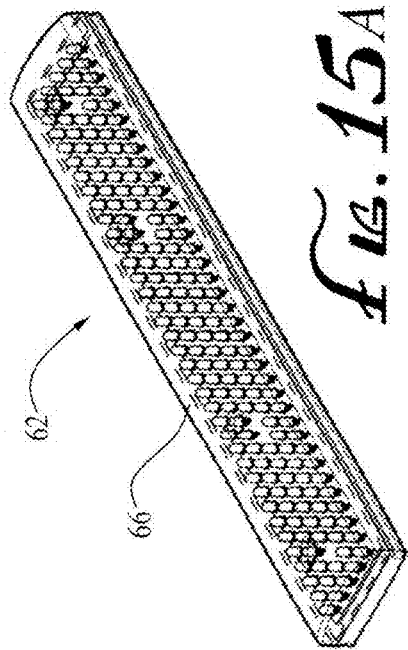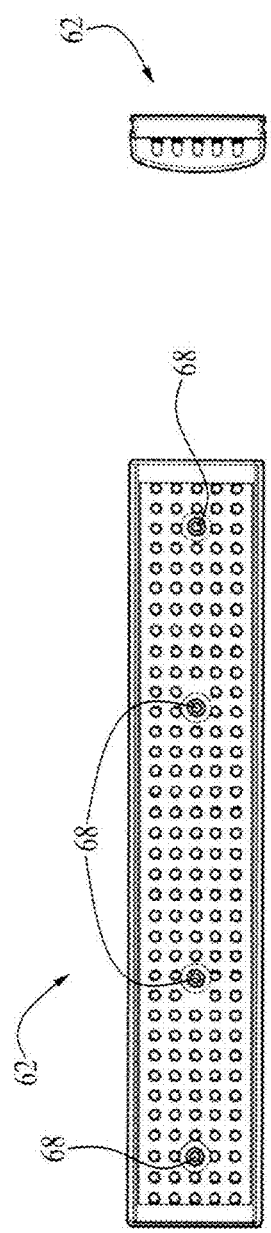

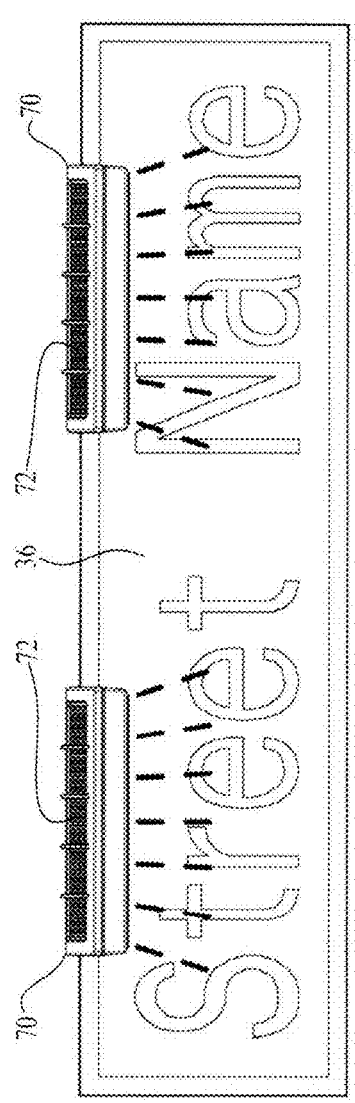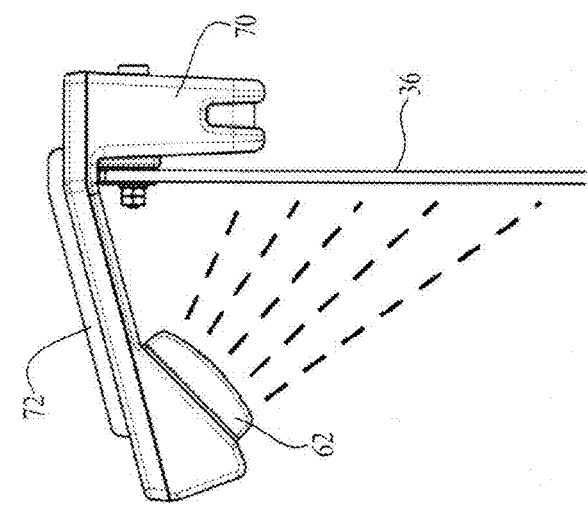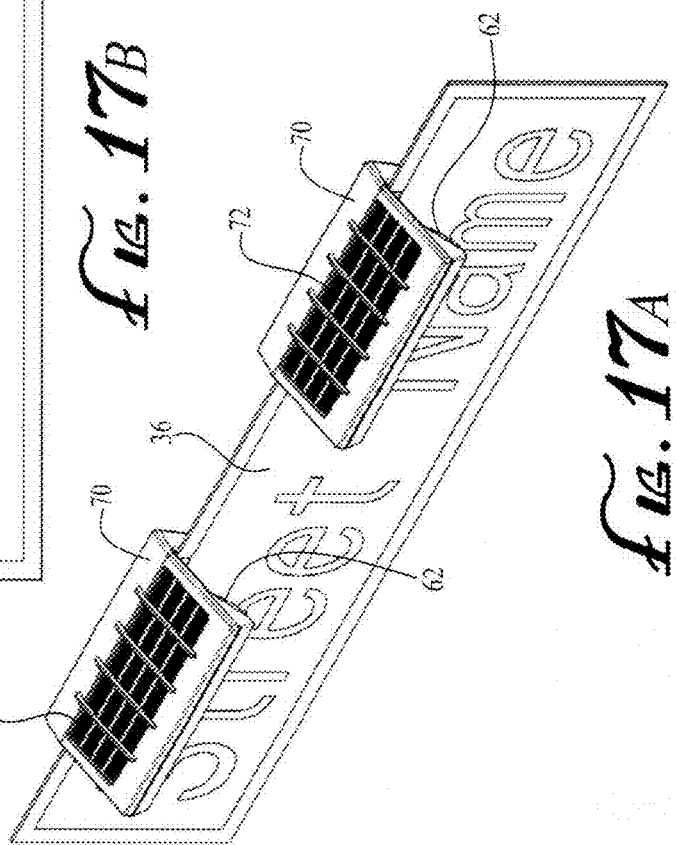

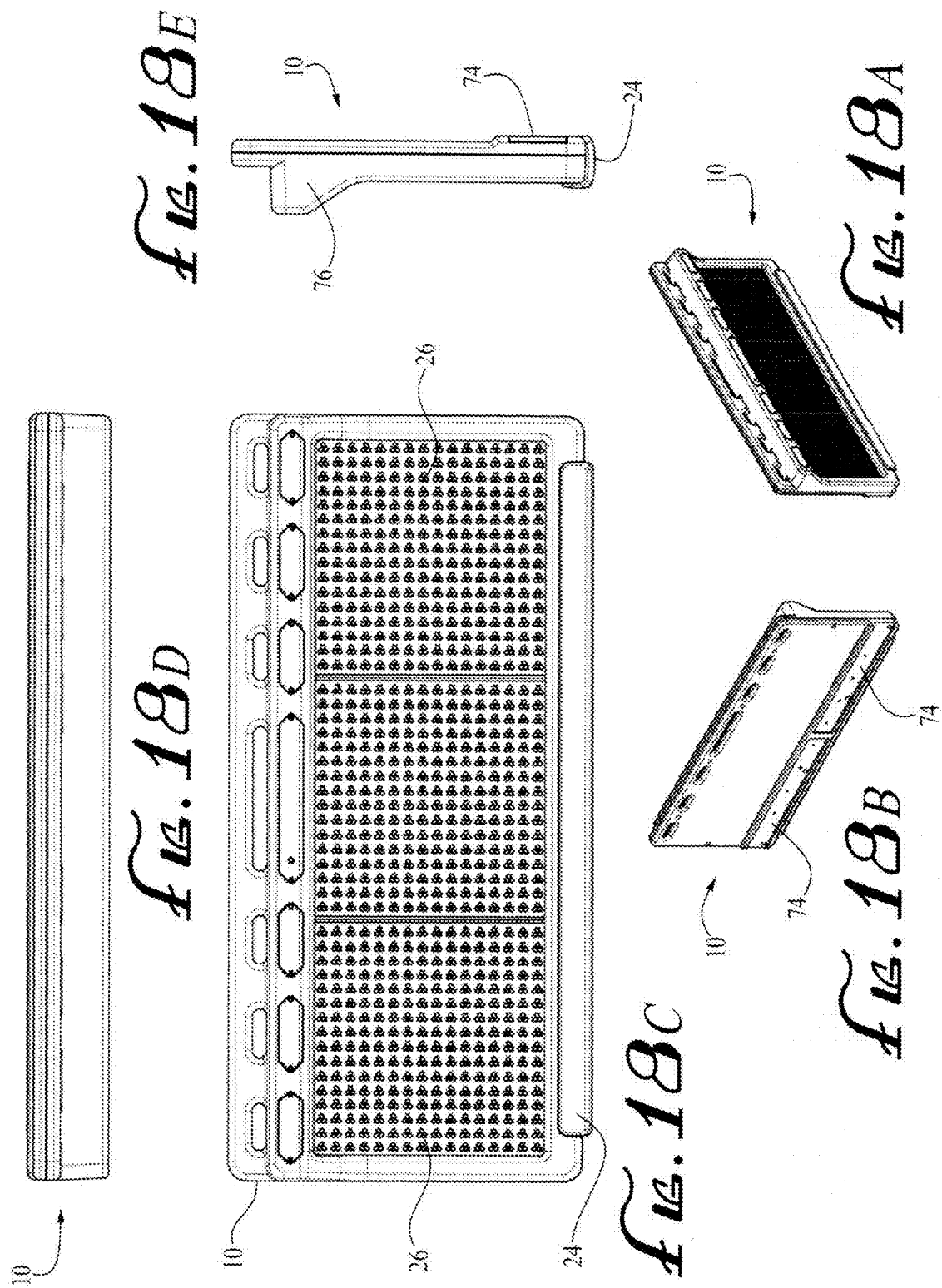

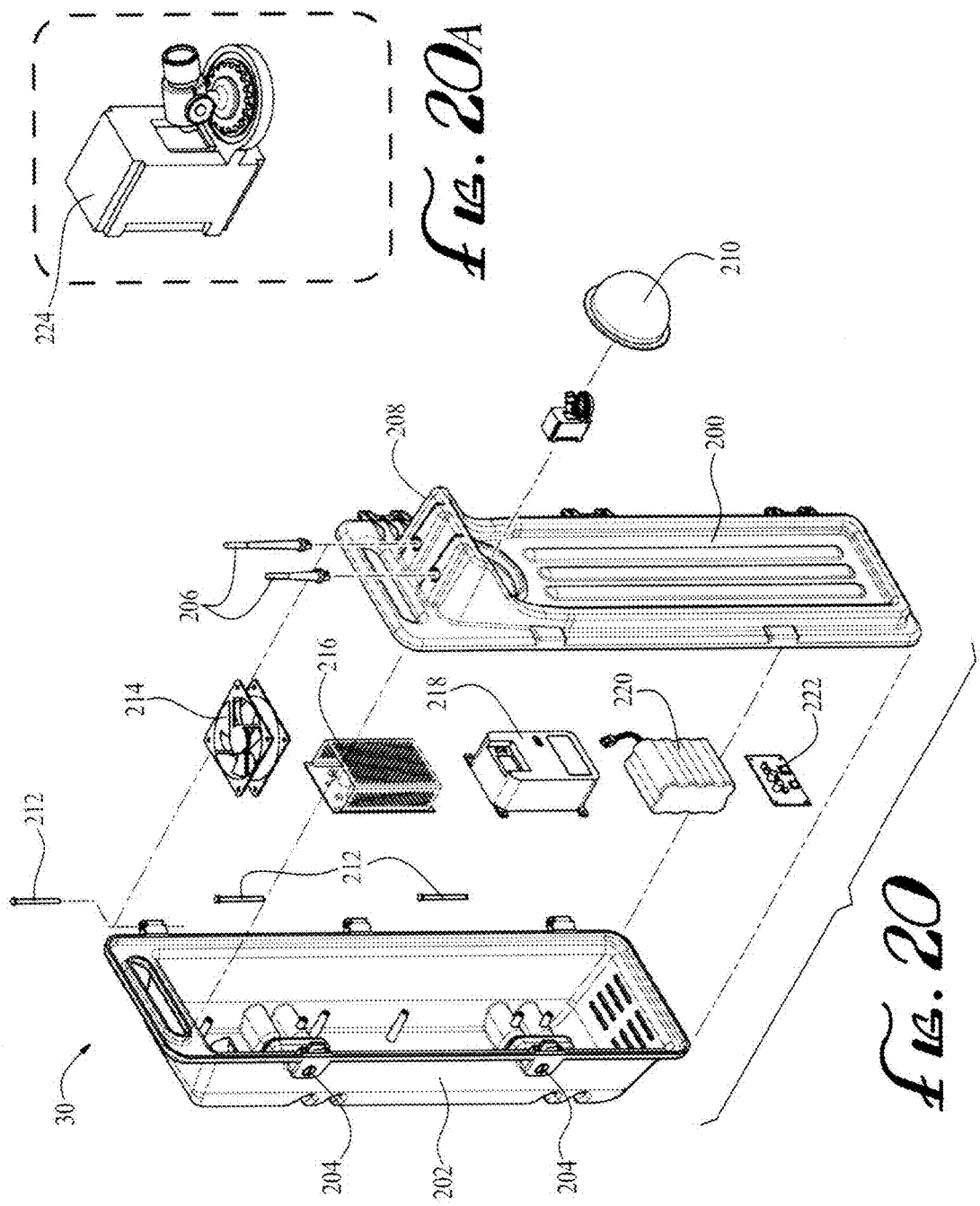

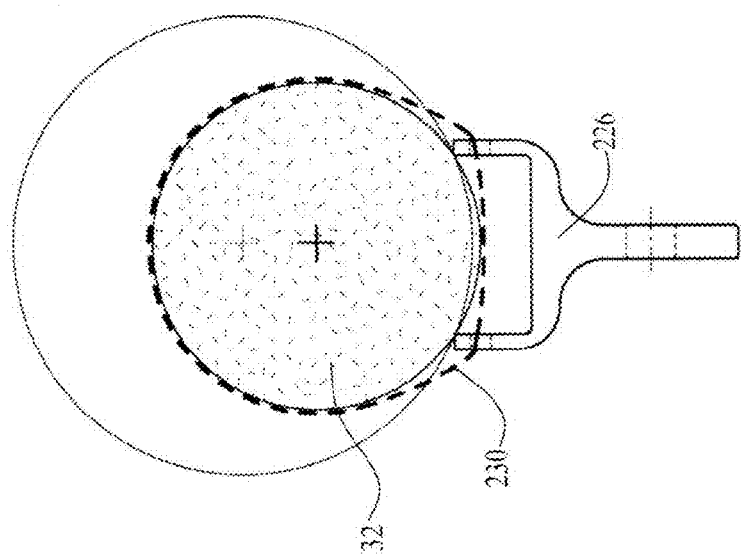
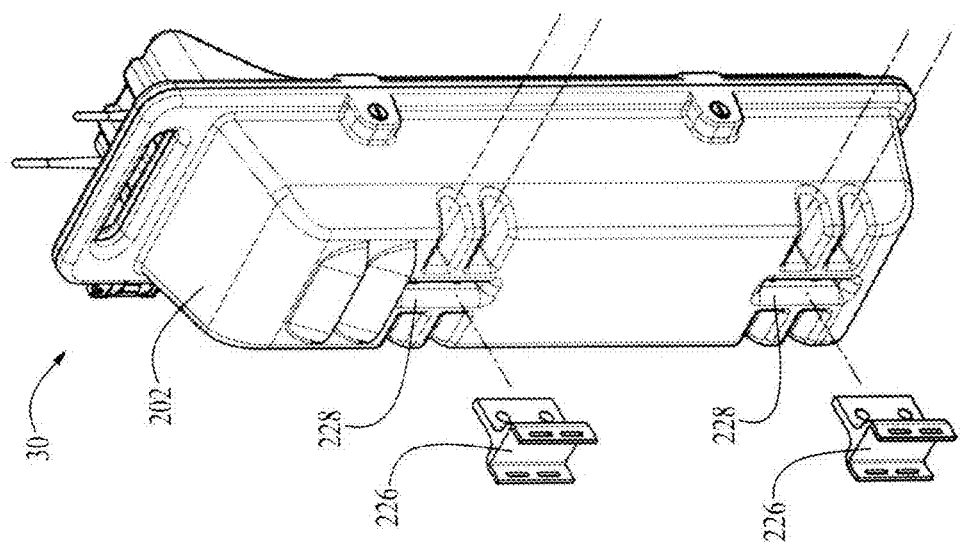

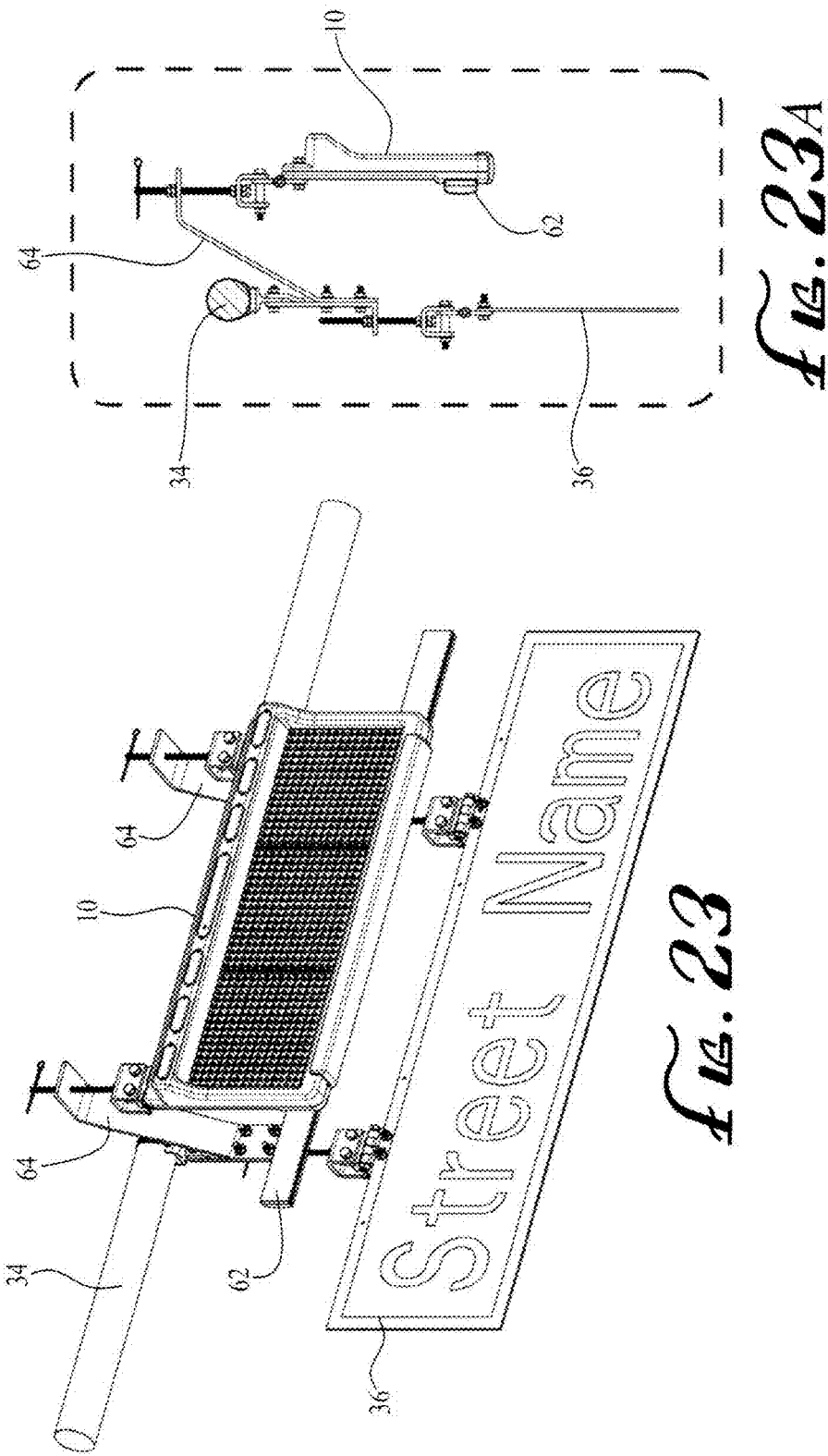

ELECTRONIC TRAFFIC ALERT SYSTEM

This application claims the priority filing date of provisional application 61/692,804, filed Aug. 24, 2012.

BACKGROUND

The present invention is directed to electronic signs and signage including hanging signage presenting highly visible visual warnings, messages, or other information to drivers both during the regular course of driving and in emergency situations.

Powered traffic signals or "stop lights" have existed since the early twentieth century. These signals have remained essentially the same in general concept with a few added refinements added such as turn arrows and symbolic "walk" or "don't walk" messages. Over the years, ground travel in and around cities has become increasingly congested with growing vehicular traffic including passenger cars, trucks, emergency vehicles, busses, trains and the like all moving through densely-populated areas.

While non-passenger vehicles such as police cars, fire trucks and ambulances typically emit visual and audible warnings as they approach intersections, they frequently lack the right-of-way, and warnings emitted from their vehicles are often unseen and/or unheard, leading to collisions and injury. In view of the increased density and speed of vehicular traffic and the current primitive state of signage technology, it is desirable for municipalities to provide significantly improved signaling and signage at intersections for better vehicular flow, safety, and to provide warnings and information among other reasons.

Known systems in the art for interfacing traffic control with emergency vehicles are known. U.S. Pat. No. 5,539,398 to Bystrak et al. discloses an enhanced group addressing system including an apparatus and method for addressing a spaced-apart detectors or control units in a multiple zone detection system. This system, which shortens the time needed for a centrally located control element to communicate with the detectors, is used for existing traffic control systems.

U.S. Pat. No. 5,172,113 to Hamer discloses a system and method for transmitting data in an optical traffic preemption system. Using this system an ambulance or other emergency vehicle may optically transmit data from an optical emitter to a detector mounted along a traffic route via a stream of light pulses. The light pulses cause a traffic signal to change allowing the approaching emergency vehicle to pass. This system lacks any communication with a central traffic command.

U.S. Pat. No. 7,113,108 to Bachelder, et al. discloses an emergency vehicle control system traffic loop preemption system. The system uses existing inductive traffic loops that are either "car-active" or "car-passive." In the "car-active" system, a passive element having position information transmits an ID tag and the position information to a transceiver in the vehicle when an emergency vehicle is detected by the existing inductive traffic loop. In the "car-passive" system, a transceiver at the intersection is activated to send an excitation signal to a transponder on the emergency vehicle, which responds with the emergency vehicle ID. This system interfaces with a central traffic control, but lacks any method of redundantly checking to make sure signal changes occur.

U.S. Pat. No. 4,704,610 to Davidson et al. discloses an emergency vehicle warning and traffic control system. This system provides early warning of the approach of an emergency vehicle and provides a display to indicate the direction from which the emergency vehicle is approaching, and preemption of traffic signals. A transmitter mounted on an emergency vehicle transmits a signal whenever it is on an emergency call, which is received by infrared receivers positioned at an intersection. This system relies on infra-red transmission of data, and cannot easily integrate with existing traffic central control computer systems.

Since known systems are inefficient and ineffective in providing information to drivers for collision avoidance or other purposes, the present invention as described herein takes major steps forward to accomplishing these objectives. One important goal of the present invention is to provide a more effective traffic signal preemption system. Currently in the market, devices exist to preempt the normal operation of a traffic signal, such as a strobe light system. While this is useful in emergencies, drivers are often unaware of where the emergency vehicles are as they approach an intersection. By providing programmed LED text and graphical movement, the present invention aims to solve problems in the prior art and reduce emergency response time. Another goal of the present invention is to provide a signal control and data transmission system capable of easy integration into existing systems known in the art.

SUMMARY

An electronic traffic alert system includes two main components, a traffic display which has a screen for displaying graphics, and a camera unit in view of the traffic display. A series of removable modular sensors ("modules") for receiving information from a vehicle such as an ambulance or other emergency vehicle is attached to the traffic display. The traffic display and camera unit are both interfaced with a centralized traffic control station, such as a municipal office of transportation operations. The interface relays information, including pictographic information and information from the modules via the traffic display and the camera unit to the centralized traffic control station.

The interface allows the centralized traffic control station to receive information from the traffic display and the camera unit, and allow traffic control officers to act on that information. The information includes an image of the traffic display presenting a graphic relevant to traffic conditions to drivers encountering the traffic display, an in the case of an emergency vehicle, information identifying the vehicle and its direction of travel. In various embodiments, it is anticipated that this process may be automated, such that the traffic display automatically displays a message relevant to information it transmits to, and receives from, a centralized traffic control.

In one particular method of operation, the traffic display, after receiving information from an emergency vehicle, presents the information to a centralized traffic control. The centralized traffic control can verify the information and optionally instructs the traffic display to present additional relevant graphics. When the graphic is displayed, the camera unit captures an image or in some embodiments video of the traffic display presenting the graphic, and transmits the image or video to the centralized traffic control. In this manner, users of the system receive confirmation that the traffic display is functioning properly.

In one embodiment, the traffic display includes a screen, large enough to be conveniently viewed by drivers, which is LED based, and capable of displaying illuminated and animated graphics, including both words and graphic icons and warning signs in the appropriate color for traffic regulations. In addition to the screen, the traffic display includes receptacles for receiving modules, which serve to collect data for the overall electronic traffic control system.

Although a variety of modules are contemplated, they principally fall into two groups, modules that sense information coming from man-made sources, such as a strobe interface for communications with existing emergency vehicles, a wireless Internet interface for communicating with computer-based sources, a FEMA transponder for emergencies, and a memory module for retaining information from these sources.

The other category of modules includes modules with sensors to detect conditions. The most commonly used of these types of modules may include a light sensor for setting the brightness of the traffic display screen, a temperature module for detecting freezing conditions, a carbon monoxide level sensor and even a seismic sensor for earthquake prone regions. Other sensors may include a photo-voltaic cell for providing auxiliary power, and a building fire alert sensor. Information from both the information receiving receiver sensors and the detector sensors is gathered and interpreted by the traffic display, and transmitted to the central traffic control station.

In addition to the various modules, the traffic display preferably includes a module comprising a tray for installing and retaining a personalized computing device such as a personal data assistant or smart phone. In this manner, the traffic display and all of its modules may be easily programmed in the field, and by using a smart phone or PDA, the interface is normalized so that the traffic display may be operated in a variety of regions without the necessity of individualized programming. The personal data assistant or smart phone is connected to the traffic display in a manner enabling a user, such as a fire or police official, to send a text from another smart phone, thereby causing the text to appear on the traffic display.

Preferably the traffic display, its screen and all of its modules, including the smart phone tray are sealed against moisture intrusion and to protect against the elements. In one preferred embodiment a rubber gasket is used between two formed clamshell pieces, which come together to form the traffic display. Also included in the traffic display are control circuit boards which include USB interfaces. The USB interfaces allow users to simply press an individual module into the traffic display, such that when it seats in the traffic display, it also engages a USB interface. This allows users to quickly and easily install modules into the traffic display.

When a module receives or detects information or a particular condition, it communicates that information to the traffic display, which further communicates the information to the central traffic control station. The central traffic control station can then send information back through the system, directing the traffic display to show a particular graphic. Once the graphic is displayed, the camera unit provides the centralized traffic control station with visual confirmation that the graphic was displayed.

Some examples include alerting drivers to emergency vehicles approaching from behind, alerting drivers to emergency vehicles in cross traffic, alerting drivers to emergency vehicles entering traffic, or alerting alerts drivers to changes in lane direction. While these are exemplary messages, it should be understood that the LED screens allow virtually any message to be displayed on the traffic display, including Department of Homeland Security alerts, AMBER alerts, slippery conditions, pedestrians crossing, etc.

In one embodiment, the traffic display is mounted above a street sign, and illuminates the street sign. The camera unit is usually mounted on a street lamp post. It is contemplated that multiple traffic displays and multiple camera units may be installed in an area to identify multiple individual emergency vehicles according to their direction of travel over a large predetermined area.

A light assembly may also be included with the assembly. The light assembly may be affixed to the rear of a traffic display, which is installed above and in front of a street sign, to provide illumination for the sign. Additionally, in instances where the traffic display is installed adjacent or away from a street sign, the light assembly may be mounted independently above the street sign and connected by wires to the traffic display. Ideally, the light assembly includes a solar array to power the light array at night.

The camera unit, like the traffic display is an enclosed unit with a weatherproof housing. In addition to the camera, which may be a pan/tilt camera with zoom capabilities, the camera unit includes memory storage for images captured by the camera unit. The camera unit also includes a cooling fan, a fail-safe battery pack, capability for wirelessly transmitting images, and a domed shield for protecting the camera. Ideally, the camera unit will be mounted to a street lamp post across an intersection from the traffic display for viewing the traffic display as it displays various graphics according to directions from the central traffic control station.

In order to install and operate the traffic control system, a user provides an intersection with the traffic display and the camera unit. When activated, the traffic display receives information from an emergency vehicle, or in some instances from a sensor module, and transmits that information to a centralized traffic control station. The traffic control station analyzes the information and then transmits directions back to the traffic display, instructing the traffic display to present a particular image. When the traffic display presents the image, the camera unit records the image and transmits it to the traffic control station. In this manner, proper functioning of multiple traffic displays may be monitored.

BRIEF DESCRIPTION OF THE FIGURES

FIG. 1 is a perspective view of a traffic display warning of an emergency vehicle.

FIG. 2 is a partially exploded view of a traffic display featuring modular electronic components.

FIGS. 3A-3L are perspective views of interchangeable modules adapted for insertion into the traffic display.

FIG. 4 is an exploded view of the traffic display unit.

FIGS. 5A-5E are views of the rear panel of the traffic display with circuit boards, a memory module, smart phone and interface.

FIGS. 6, 6A and 6B are views of the traffic display and camera unit installed on a street light.

FIGS. 7 and 7A-7C are views of the traffic alert system used to advise drivers of an emergency vehicle approaching from the rear.

FIGS. 8 and 8A-8C are views of the traffic alert system used to advise drivers of an emergency vehicle approaching from the side.

FIGS. 9 and 9A-9B are views of the traffic alert system used to advise drivers of an emergency vehicle entering traffic.

FIGS. 10 and 10A-10C are views of the traffic alert system used to advise drivers of changing lane directions.

FIGS. 12A-12D show the components of the traffic alert system interfacing with a central municipal traffic control.

FIG. 13 shows an information screen on the central traffic control station.

FIGS. 14A and 14B show the traffic display installed in two configurations.

FIGS. 15A-15D show the light arrays for illuminating a street sign.

FIGS. 17A-17C show a street sign illuminated by the light assemblies.

FIGS. 18A-18E show various external views of the traffic display.

FIGS. 20 and 20A show internal components of the camera unit.

FIG. 21 is a perspective view of attachment brackets being affixed to the camera unit.

FIG. 22 is a top view of an attachment bracket.

FIGS. 23 and 23A show a perspective and side view, respectively, of the bracket holding the traffic display and street sign in place.

REFERENCE NUMBERS

Figure 11G:
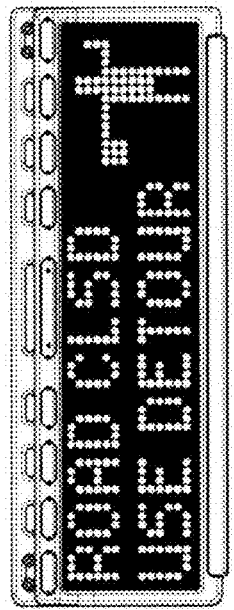
FIGS. 11G-11L are views of various alerts which may be displayed by the traffic display according to a variety of traffic scenarios.

- 10. Traffic Display
- 12. Screen
- 14. Front Panel
- 16. Rear Panel
- 18. Fastener
- 20. Gasket
- 22. Aluminum Rod
- 24. Bumper
- 26. LED Array
- 28. Control Circuit Boards
- 30. Camera Unit
- 32. Street Lamp
- 34. Signage Support
- 36. Street Sign
- 38. Ambulance
- 40. Intersection
- 42. Vehicles
- 44. Street Light
- 46. Animated Arrow
- 48. Ambulance Icon
- 50. Fire Station
- 52. One Way Sign
- 54. Central Traffic Control Station
- 56. Traffic Data
- 58. First Screen
- 60. Second Screen
- 62. Lighting Array
- 64. Hanging Bracket
- 66. Optic Lensing
- 68. Captive Screws
- 70. Light Assembly Unit
- 72. Solar Array
- 74. Anchors
- 76. Cowl
- 100. LED Light Alert
- 102. FEMA Transponder
- 104. Light Sensor
- 106. 3M® Strobe Interface
- 108. Temperature Sensor
- 110. LOOPCOMM® Emergency Interface Module
- 112. Memory Module
- 114. Receiver tray
- 116. Smart Phone
- 118. Carbon Monoxide Level Indicator
- 120. Building Fire Alert Interface Module
- 122. Seismic Detection Apparatus
- 124. Photovoltaic Power Cell
- 126. School Emergency Module
- 128. Sensor Gasket
- 130. Clip
- 132. USB Jack
- 134. USB receptacle
- 200. Hinged Front Panel
- 202. Body
- 204. Keyed Locks
- 206. Antennas
- 208. Camera Unit Visor
- 210. Camera Dome
- 212. Stainless steel hinge pins
- 214. Cooling Fan
- 216. Power Supply Regulator
- 218. Black Box Recorder
- 220. Fail-Safe Battery Pack
- 222. Control Circuitry
- 224. Camera
- 226. Attachment Brackets
- 228. Attachment Sockets
- 230. Attachment Band

DESCRIPTION

Referring to FIG. 1, the electronic traffic alert system includes a traffic display 10. The traffic display 10 includes a large screen 12 adapted for displaying a variety of signals, warnings and other traffic related information. In the illustrated embodiment for example, a warning of an approaching fire engine is displayed. In addition to the display, the traffic display 10 provides several means for sensing and reporting data relevant to traffic conditions.

In the illustrated embodiment, these sensors include an LED light alert 100 for attracting drivers' attention to the traffic display to prevent them from blocking an intersection (not shown). A FEMA Transponder 102 enables transmission of data to FEMA systems for directing FEMA responders in the event of an emergency. A light sensor 104 is included for adjusting the display brightness for optimum visibility in day and nighttime operating conditions. A 3M® Strobe Interface 106 is installed to allow communication with emergency vehicles equipped with proprietary 3M® light-changing technology, allowing emergency vehicles to control traffic lights associated with the traffic alert system. A temperature sensor 108 may be included for indicating icy conditions on roads, and a LOOPCOMM® emergency interface module 110 may be included for wireless connectivity.

Referring to FIG. 2, the traffic display 10 is shown in a partially exploded view with a memory module 112, receiver tray 114 and smart phone 116 in the process of installation and/or removal from the traffic display. The inclusion of a memory module and computing functionality by smart phone and a related interface, allows the traffic alert system to be programmed for a variety of purposes and in multiple settings. This allows the traffic alert system to be adaptable for regions experiencing different types of emergencies (e.g., seismic emergency, temperature emergency, etc.). Also, by interfacing with a standard smart phone, the necessity of providing a specialized interface and programming is avoided. A uniform application stored on the smart phone can tailor traffic alert systems for virtually any region or condition.

Referring to FIGS. 3A-3L, a variety of modules may be incorporated in to the traffic display (not shown). FIGS. 3A, 3J, 3B, 3F, 3L, and 3H illustrate the LED light alert, FEMA Transponder 102, Light Sensor 104, 3M® Strobe Interface 106, temperature sensor 108, and LOOPCOMM® 110 emergency interface module, respectively. Other modules that may be used with the traffic display include a carbon monoxide level indicator 118 as shown in FIG. 3C, the memory module 112 as shown FIG. 3D (also shown in FIG. 2), a building fire alert interface module 120, as shown in FIG. 3E, a seismic detection apparatus 122 as shown in FIG. 3G, a photovoltaic power cell 124 as shown in FIG. 3I, and a school emergency module 126 as shown in FIG. 3K.

The carbon monoxide level indicator 118 is useful in urban situations for monitoring air quality as well as in emergency situations, such as in the event of a fire, including chemical fires. The building fire alert module 120 may comprise a smoke sensor and may produce an audible signal to alert drivers to a nearby building fire. The seismic detection apparatus 122 may be used to immediately report a seismic disturbance in areas prone to earthquakes. The photovoltaic power cell 124 can be used to provide some power to the traffic display 10 or sub-components in the event of a loss of power.

Referring to FIG. 4, an exploded view of the traffic display 10 is shown. The traffic display 10 includes a front panel 14 and a rear panel 16, which may be anchored together using a fastener 18, or another type of anchor. In order to ensure a weather proof construction a gasket 20, including a weather seal rubber gasket is provided between the front panel 14 and rear panel 16. To provide stability in the traffic display 10, an aluminum rod 22 extends the length of the traffic display 10 on its interior. Although and aluminum rod is used in the illustrated embodiment, other substantially rigid members may be used. On the bottom of the traffic display 10, a bumper 24 provides both structural strength as well as protecting the traffic display 10 in the event the traffic display 10 is struck by a high profile vehicle (not shown).

Inside the traffic display 10, a series of LED arrays 26 are placed adjacent one another to form the screen of the traffic display 10, which shows both static and animated warnings, advisories and other information. Although a series of LED arrays 26 are shown in the illustrated embodiment, one large LED array (not shown) may be used. Control circuit boards 28 are also provided above the LED arrays 26. Although the memory module 112 is shown, the presence of multiple connections on the control circuit boards 28 allows various other modules as illustrated in FIGS. 3A-3L to be installed. In any event, it is anticipated a sensor gasket 128, similar to the traffic display 10 gasket 20 will be used to prevent moisture intrusion and to seal the traffic display 10.

Referring to FIGS. 5A-5D, equipping the traffic display 10 (not shown) with programmable features is shown. FIG. 5A shows the memory module 112. Preferably, the memory module 112 includes a clip 130 for retaining the memory module 112 in the traffic display 10. To provide communication, a USB jack 132 is affixed to the memory module 112. In a preferred embodiment, the memory module 112 and other modules shown in FIGS. 3A-3L are sized so that by inserting them into the traffic display 10, the clip clicks, holding them in place just as the USB jack 132 connects into a USB receptacle 134 (FIG. 5B).

Referring to FIG. 5B, the control circuit boards 28 include USB receptacles 134 in an array. As illustrated, two circuit boards 28 are shown, each bearing three USB receptacles 134. FIG. 5C illustrates the manner in which a memory module 112 aligns with one of the USB receptacles 134. FIGS. 5D and 5E illustrates how a smart phone 116 or similar standardized computing apparatus installs into the receiver tray 114. Preferably, the receiver tray 114 is connected to the circuit boards, allowing the smart phone 116 to interface with the memory module 112, and other modular components of the traffic display 10.

Referring to FIGS. 6, 6A and 6B, the traffic alert system includes two primary units; a traffic display 10 and a camera unit 30. In FIG. 6, the traffic display 10 and camera unit 30 are shown as they would appear to an oncoming vehicle. The display unit 10 and camera unit 30 attach to a conventional street lamp 32 and signage support 34, respectively. The display unit 10 is preferably adapted to support a conventional street sign 36, and the camera unit 30 preferably includes a variety of elements, including a loudspeaker, power adapter, and communications equipment (not shown), discussed in detail below.

Referring to FIG. 7, one use of the traffic system, in this instance in an emergency capacity, is shown. In this scenario, an ambulance 38 is approaching an intersection 40 from behind several vehicles 42. As shown in FIGS. 7A-7C, although the street light 44 is green, the display unit 10 displays an animated arrow 46, for instance in green on a red background instructing the vehicles 42 traveling in the same direction as the ambulance 38 to pull to the right to allow the ambulance 38 to pass. In a contemplated alternative embodiment, the traffic display 10 might also display a "pull over" message. The camera unit 30 on an opposite side of the intersection 40 provides visual confirmation to a traffic control center (not shown in this view) that the traffic display 10 is correctly directing traffic.

Referring to FIG. 8, use of the system in another emergency capacity is shown. In this view, the ambulance 38 is approaching an intersection 40 from an angle perpendicular to the vehicles 42. As the ambulance 38 approaches the intersection 40, the display unit 10 illuminates to alert vehicles 42 of the ambulance 38 approaching from a cross direction. Its direction of travel is indicated using an ambulance icon 48, which may include an animated ambulance and arrow LED image. The traffic alert system also interfaces with traffic control (not shown) to cause the street light 44 to turn red. The traffic displays 10 facing cross traffic in two directions may issue a directional warning to oncoming drivers in both directions. Additionally, the camera units 30 on opposite sides of the intersection 40 provide visual confirmation to a traffic control center (not shown in this view) that the traffic displays 10 are correctly directing traffic.

Referring to FIG. 9, use of the system in another emergency capacity is shown. In this view, the traffic display 10 displays an animated LED image of an ambulance icon 48 as the ambulance 38 enters traffic, and displays the direction from which the ambulance 38 is entering traffic, including preferably when it is backing into a fire station 50 as well. As shown in FIGS. 9A and 9B, two display units 10 may be mounted back-to-back to alert traffic coming from two different directions.

Referring to FIG. 10, use of the system in a non-emergency capacity is shown. In this view, a lane direction has been reversed as a vehicle 42 approaches an intersection 40.

Frequently lane directions are changed due to special events such as when a large number of vehicles leave a stadium or a similar venue, or in high traffic areas when a lane direction must be changed at various times of day. In this situation, the traffic light 44 is instructed to display a caution signal such as a flashing yellow light, while the traffic display 10 displays a standard one-way sign 52, which may be animated if necessary. As with the other traffic scenarios, the camera unit 30 transmits an image of the traffic display 10 opposite the camera unit 30 to a traffic control center (not shown) to ensure proper functioning of the traffic display 10, and is used to detect vehicles in the turn lane, about to turn the wrong direction.

Referring to FIGS. 11G-11L, various messages appearing on the traffic display 10 (not shown) are shown for a variety of traffic conditions. The messages displayed are contemplated to address both emergency and non emergency traffic advisory scenarios.

Figure 11H:
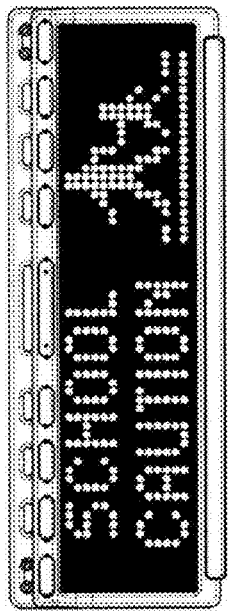
Figure 11I:
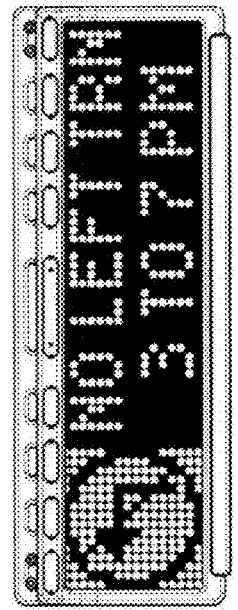
Figure 11J:
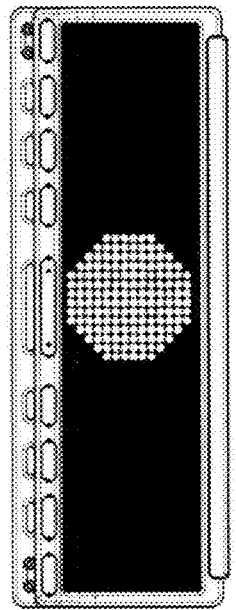
Figure 11K:
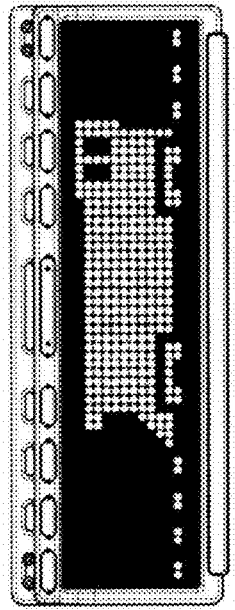
Figure 11L:
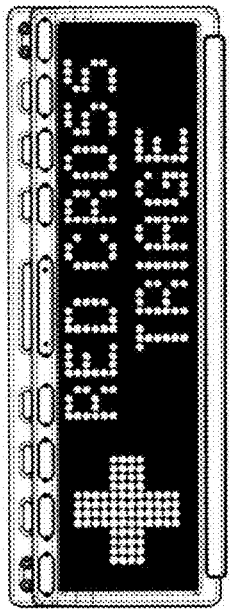

FIG. 11G shows a road closed and detour sign for temporary road closures due to construction, etc. FIG. 11H shows a pedestrian crossing warning for use near schools. 11I shows a temporary no left turn signal for use in areas with high traffic commute periods. FIG. 11J shows a stop sign flashing red or acting as a three color traffic light for use when a normal light-regulated intersection, either due to a temporary emergency, or malfunction of the conventional traffic light. LLK shows a light rail crossing warning. FIG. 11L shows a sign for a Red Cross triage location.

Referring to FIGS. 12A-12D, the traffic display 10, camera unit 30, and a central traffic control station 54 are shown. The central traffic control station 54 receives wireless transponder tags from detectors and fire trucks, determines their directions of travel, and displays the proper emergency messages on the traffic display 10 to enhance traffic safety. Preferably, the program also runs as part of a municipal traffic management center (not shown). In this view, the traffic alert system is shown reacting to the presence of an approaching emergency vehicle (not shown). As the emergency vehicle approaches an intersection 40 (not shown), the traffic signal 20 (not shown) changes to red, signaling oncoming cars to stop. The traffic display 10 displays an animated ambulance icon 48, preferably including a directional indicator. As the traffic display 10 displays the ambulance icon 48, the camera unit 30 provides verification that the sign is operational, transmitting image information to the central traffic control station 54. The central traffic control station may display an image of the ambulance icon 48, a photo of the intersection (not shown), or traffic data 56 indicating the direction of the ambulance 38 (not shown).

Figure 13:
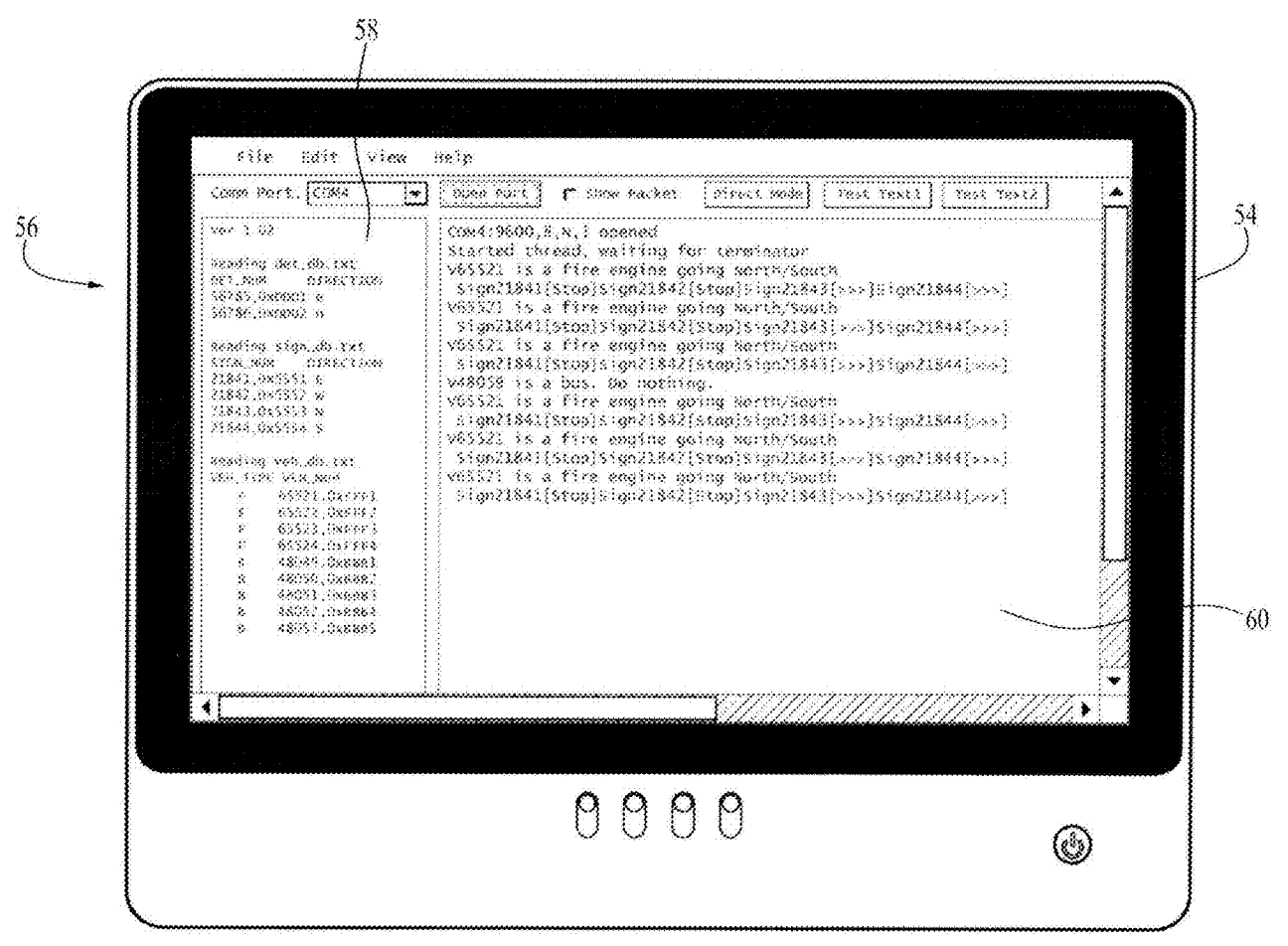

Referring to FIG. 13, the central traffic control station 54 is shown displaying real-time log and graphic confirmation information. The central traffic control station 54 is compatible with existing traffic control information systems, and enhances the information available to traffic controllers. The information displayed on a first screen 58 indicates the vehicle type (e.g. a fire engine) and individual vehicle numbers for individual vehicles (not shown) monitored by the system. Information displayed on a second screen 60 includes real time information on the direction of travel as various vehicles pass through a series of traffic signals.

Referring to FIGS. 14A and 14B, the traffic display 10 is shown in two installation configurations. FIG. 14A shows the street sign 36 suspended from the traffic display 10, which is suspended from a signage arm 34. The street sign 36 is illuminated by two light arrays 62, which are affixed to the traffic signal 10. FIG. 15B shows an alternative embodiment wherein the street sign 36 is suspended directly from the signage arm 34, and the hanging bracket 64 with light arrays 62 are attached to the street sign. In this embodiment, it is anticipated that the light arrays 62 will be powered by the traffic display 10 using a power cable (not shown) which may or may not travel inside the signage arm 34.

FIGS. 15A through 15D show a light array 62 in various orientations. FIG. 15A shows a perspective view of the light array 62 which has optic lensing 66 causing light diffusion and a full coverage beam angle for street signs (not shown) which are longer than the light array 62. FIG. 15B shows a top view of the light array 62, including captive screws, which attach the light array 62 to a light assembly unit 70 (shown in FIGS. 16A and 16B). In one embodiment, the light array may be 17 inches long by three inches wide. FIG. 15C shows a side view of the light array 62, which, in one embodiment, may be 1.25 inches in thickness. FIG. 15D shows a side view of the light array 62.

Figure 16B:
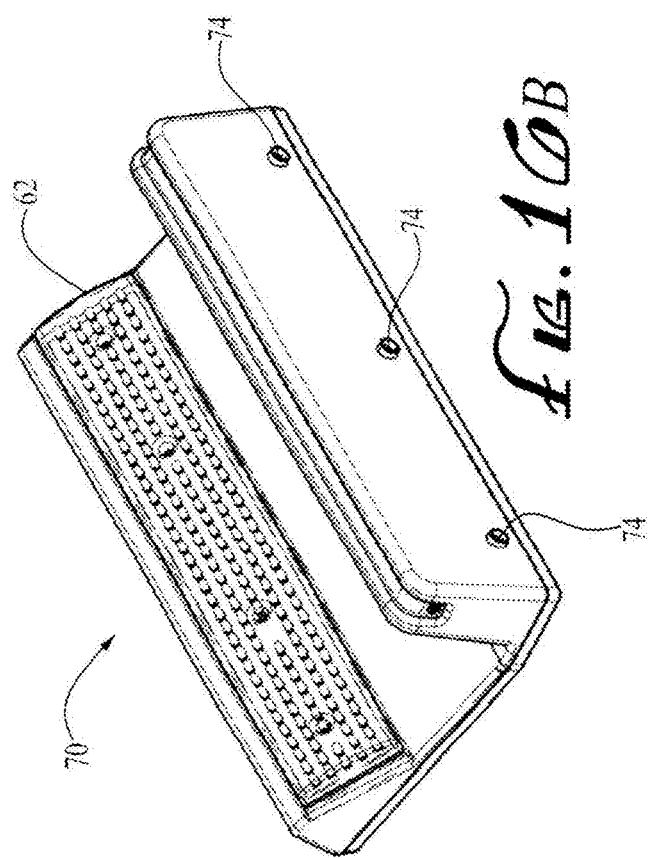
FIGS. 16A and 16B show a light assembly unit for holding a light array.
Figure 16A:
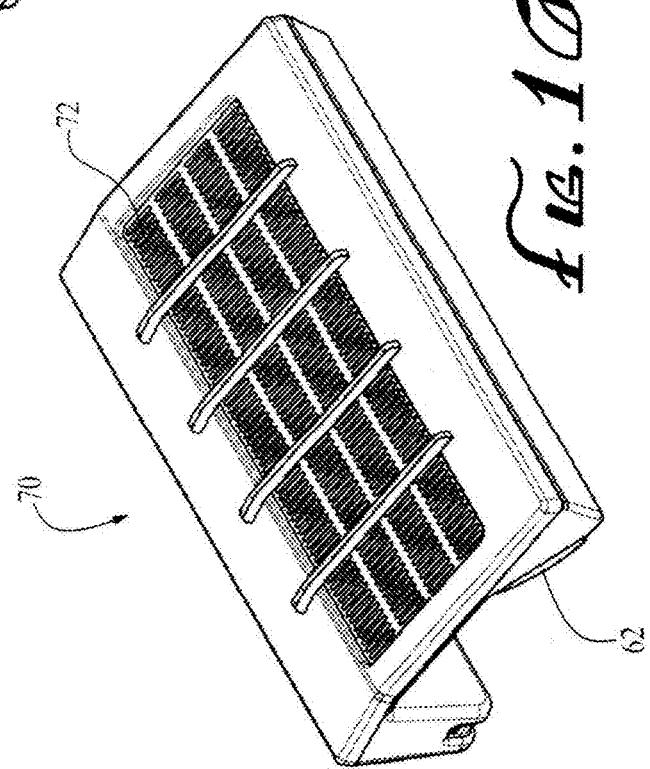

FIGS. 16A and 16B show the light assembly unit 70, which holds the light array 62. Referring to FIG. 16A, the light assembly unit 70 preferably includes a solar array 72 for charging batteries (not shown) and powering the light arrays 62 when in use. Referring to FIG. 16B, the light assembly unit 70 has connectors 74 for attaching the light assembly unit to a street sign 36 (not shown). As shown in both FIGS. 16A and 16B, the light assembly unit 70 holds the light array 62 at an angle to light the street sign 26 effectively.

FIGS. 17A-17C show the light assembly units 70 affixed to a street sign 36. FIG. 17A shows a perspective view of the street sign 36 with the light assembly units 70 attached over it. The solar arrays 72 collect energy during the day and use it to power the light arrays 62 at night. FIG. 17B shows a front view of the street sign 36 and light assembly units 70. Preferably, the light assembly units 70 are evenly spaced across the top of the street sign 36 for best illumination. FIG. 17C shows a side view of the street sign 36 with the light assembly unit 70 affixed to it using the connectors 74. The solar array 72 is also shown, as is the angle of the light array 62, causing light to strike the street sign 36 at an angle.

Referring to FIGS. 18A-18E, the traffic display 10 is shown. FIG. 18A shows a front perspective view of the traffic display 10. FIG. 18B shows a rear perspective view of the traffic display 10, including anchors 74 for the light assembly units 70 (not shown), when installed directly to the traffic display 10. FIG. 18C shows a front view of the traffic display 10, including the LED arrays 26 which form the screen 12, and positions for installing the various components shown in FIGS. 3A through 3L. Also shown in FIG. 18C is the bumper 24. FIG. 18D is a top view of the traffic display 10. FIG. 18E is a side view of the traffic display 10, which also shows the bumper 24, the anchors 74 and a cowl 76, which protects the screen 12 from falling objects, rain and snow.

Figure 19C:
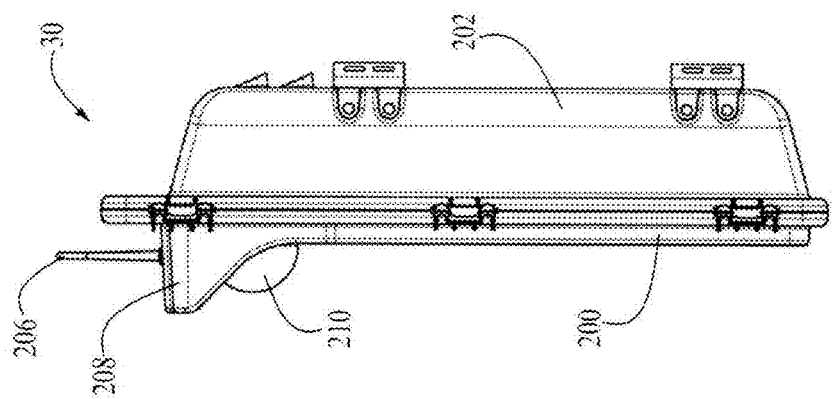
FIGS. 19A-19C show various external views of the camera unit.
Figure 19B:
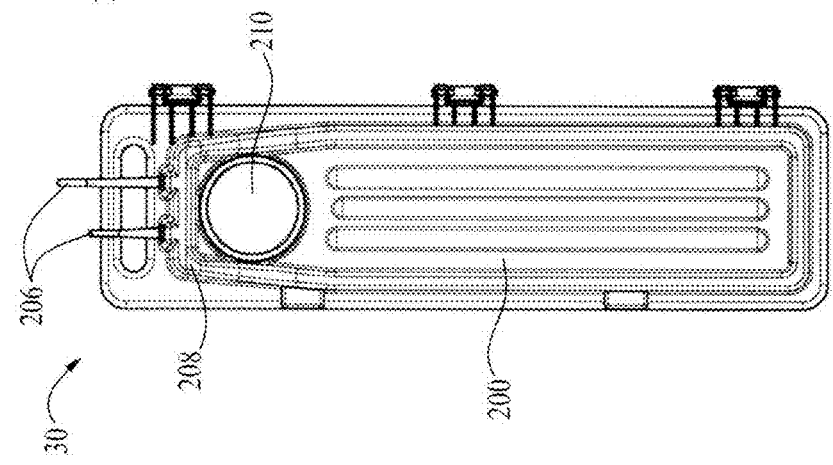
Figure 19A:
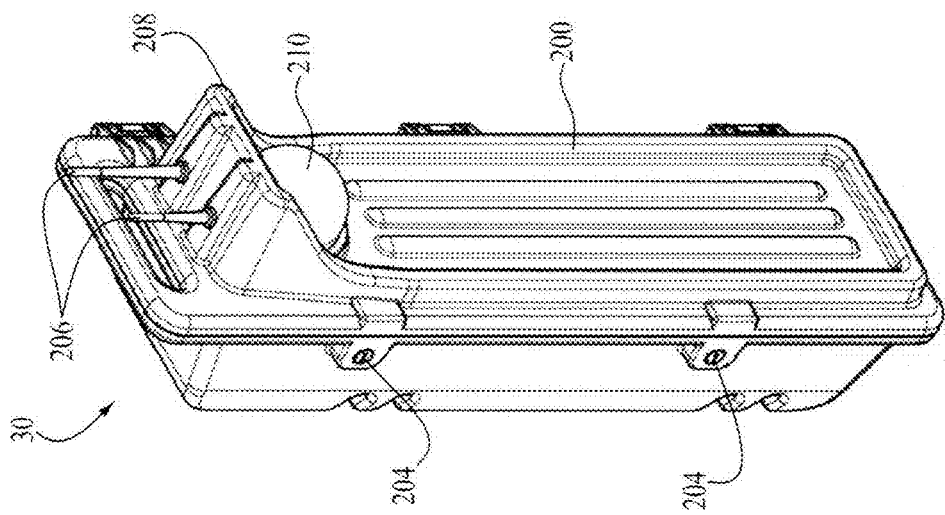

Referring to FIG. 19, detailed views of the camera unit 30 and its component parts are shown. FIG. 19A shows a perspective view of the camera unit 30. The camera unit 30 includes a hinged front panel 200 for interior access and maintenance, connected to a body 202 which houses the electronics of the camera unit 30 and may be made of a rugged polymeric material. Preferably two keyed locks 204 prevent unauthorized access to the camera unit 30, and the interior may be cooled by both forced air and natural convection. Communication is facilitated by antennas 206, mounted atop the camera unit 30. In one embodiment, the antennas 206 are mounted on a camera unit visor 208 which covers a camera dome 210. FIGS. 21B and 21C show front and side views of the camera unit 30, respectively. Preferably, the camera unit 30 may be thirty six inches in height, and ten inches in width, to conform to the shape of a street lamp 32. Also the distance from the rear of the camera unit 30 to the brim of the camera unit visor 208 may be approximately eleven inches.

FIGS. 20 and 20A show the internal features of the camera unit 30. Referring to FIG. 20, the camera unit 30 includes stainless steel hinge pins 212 which connect the hinged front panel 200 to the body 202. A cooling fan 214 keeps the components of the camera unit 30 from overheating. A power supply regulator 218 is included for regulating power within the camera unit 30, and a black box recorder 218 preserves a record of images captured by the camera in addition to transmitting those images to the central traffic command (not shown). In addition to the power supply regulator 216, a fail-safe battery pack 220 is included for providing power to the camera unit 30. Control circuitry 222 governs the operation of the camera unit 30 and in particular controls the movements of the camera 224, which may be a multi-axis pan-zoom-tilt camera.

Referring to FIG. 21, attachment brackets 226 are used to affix the camera unit 30 in place. The attachment brackets 226 are preferably inserted into attachment sockets 228 on the camera unit 30. Referring to FIG. 22, the attachment brackets 226 are attached to a street lamp 32 (defined as the lamp itself and its supporting tower), by an attachment band 230, which encircles and is tightened against the street lamp 32.

Referring to FIGS. 23 and 23A, in some embodiments, the traffic display 10 and street sign 36 are disposed from a common hanging bracket 64. In such instances the hanging bracket 64 is attached to a signage support 34. The hanging bracket 64 disposes the traffic display 10 above and in front of the street sign 36 as shown. In this manner the light arrays 62 are sufficiently outward from and above the majority of the street sign 36, such that they may evenly light the street sign 36.

Figure 24:
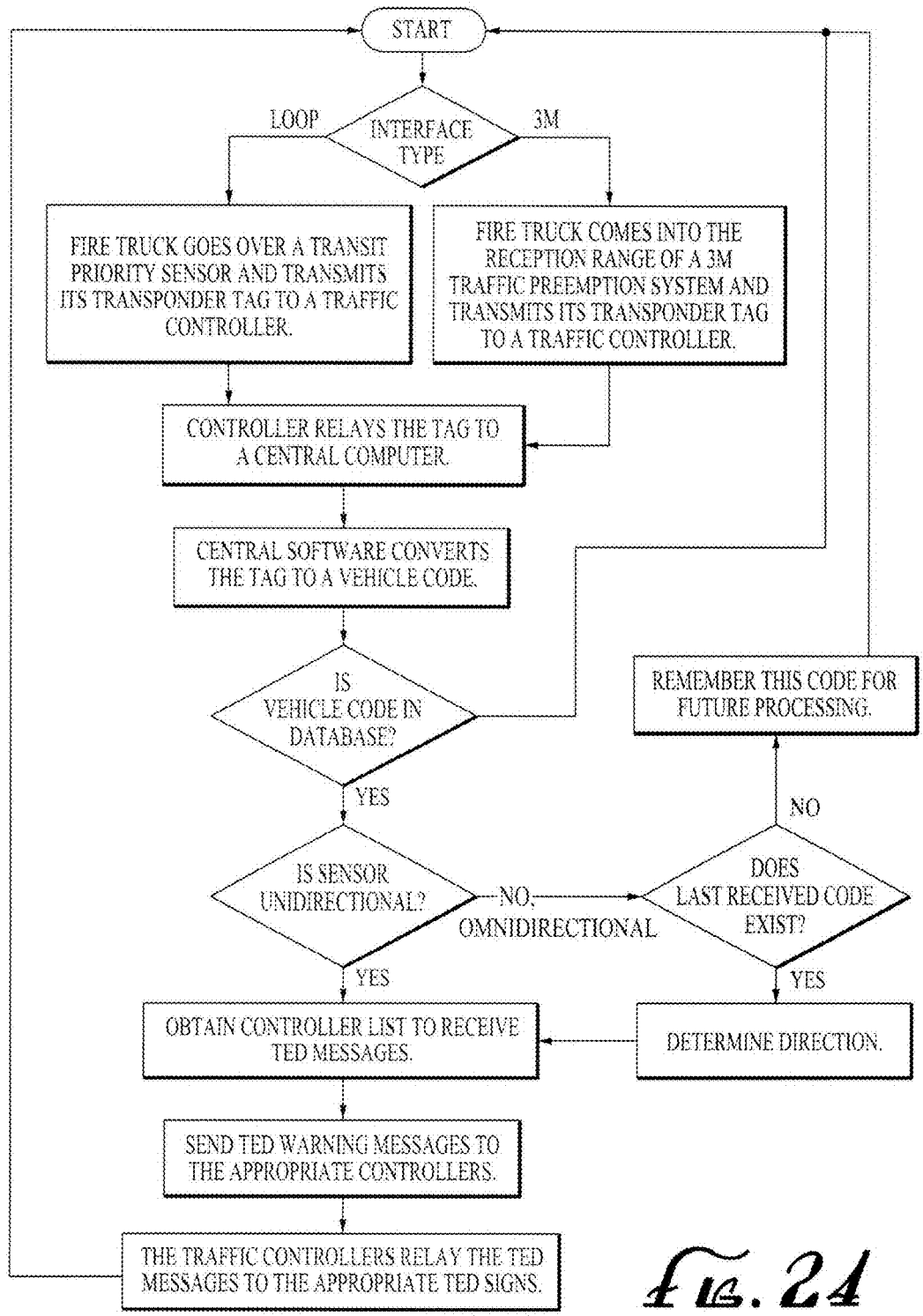
FIG. 24 is a flow chart diagram illustrating the system process.

Referring to FIG. 24, operation of the system is described as a flow chart. The system commences operation from one of two types of vehicle communications. Either an emergency vehicle travels over a transit priority sensor, thereby transmitting a unique transponder tag to the traffic controller. Alternatively, the emergency vehicle may come within range of a "3M" type traffic preemption system and likewise transmit its unique transponder tag to the traffic controller.

Once the transponder tag is transmitted, the controller relays the tag to a central computer, where software converts the tag to a vehicle code. The computer then checks the vehicle code against a code database. Unknown codes may be stored for later processing. If the code is known, the system then determines whether or not the sensor is unidirectional. If the sensor is omni-directional, the system checks the previous instance of receiving the vehicle code to determine its direction. If there is no last code in the database, the code may be stored for later processing. It is anticipated the codes for vehicles transmitted to the central computer will include codes for emergency vehicles and non-emergency vehicles.

Once the direction of a vehicle has been determined, either through a unidirectional sensor, or by comparing sequential codes, the system obtains a controller list to receive messages to display on the system. Those messages are sent to the appropriate traffic controllers, and the traffic controllers relay the messages to the appropriate display units.

Figure 25:
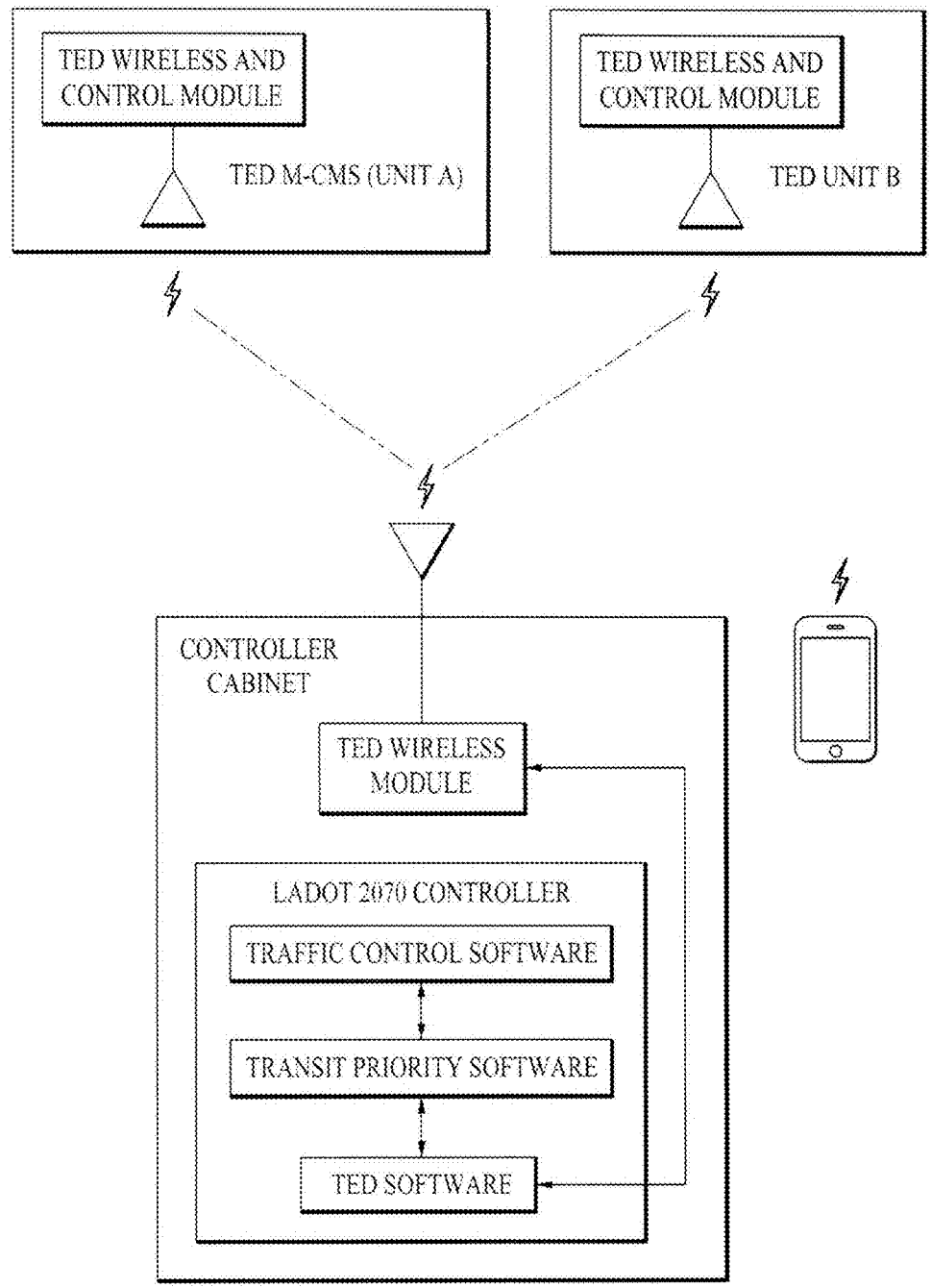
FIG. 25 is a diagram illustrating wireless communication to the display unit and camera unit.

Referring to FIG. 25, both the display unit 10 and the camera unit 30 may be wirelessly controlled by an existing traffic controller cabinet, or by smart phone. In the case of a controller cabinet, a wireless module is installed in the cabinet, and system software installed in an existing controller, for instance an LADOT (Los Angeles Department of Transportation) 2070 Controller. The controller is programmed with traffic control software and traffic priority software. The system software interfaces with the traffic control and priority functions and issues commands to the wireless module for export to the display units and camera units.

While the present invention has been described with regards to particular embodiments, it is recognized that additional variations of the present invention may be devised without departing from the inventive concepts.

What is claimed is:

1. An electronic traffic alert system for communicating with an emergency vehicle and a centralized traffic control station comprising:
   a traffic display having a screen for displaying graphics;
   a removable modular sensor affixed to the traffic display, the removable modular sensor capable of sensing emergency-related information from the emergency vehicle and transmitting the emergency-related information to the traffic display;
   a camera unit aimed at the traffic display;
   an interface to transmit the emergency-related information between the traffic display, the camera unit and the centralized traffic control station, wherein the interface relays the emergency-related information, including pictographic emergency-related information, from the camera unit to the centralized traffic control station; and
   wherein the interface transmits directions from the centralized traffic control station to control the traffic display.

2. The electronic traffic alert system of claim 1 wherein the graphics are illuminated animated graphics.

3. The electronic traffic alert system of claim 2 wherein the illuminated animated graphics include icons comprising warning signs in a predetermined color corresponding to traffic regulations.

4. The electronic traffic alert system of claim 1 wherein the removable modular sensor is capable of receiving emergency-related information from a moving vehicle and thereafter causing the traffic display to indicate the direction of the vehicle to drivers travelling in a perpendicular direction.

5. The electronic traffic alert system of claim 1 wherein the removable modular sensor is capable of receiving emergency-related information from a moving vehicle and causing the traffic display to warn drivers of vehicles approaching from ahead and from behind.

6. The electronic traffic alert system of claim 1 wherein the removable modular sensor is capable of receiving emergency-related information from a moving vehicle and thereafter causing the traffic display to warn drivers of vehicles entering traffic.

7. The electronic traffic alert system of claim 1 wherein the traffic display is capable of receiving emergency-related information from the centralized traffic control station and thereafter displaying an alert to drivers regarding lane direction changes.

8. The electronic traffic alert system of claim 1 wherein the removable modular sensor is sealed against moisture intrusion when installed in the traffic display.

9. The electronic traffic alert system of claim 1 wherein the removable modular sensor is installed in a cowl of the traffic display.

10. The electronic traffic alert system of claim 1 further comprising a personal computing device capable of receiving text emergency-related information and causing the text emergency related information to appear on the traffic display.

11. The electronic traffic alert system of claim 1 wherein the removable modular sensor, upon receiving emergency-related information from a vehicle, communicates the emergency related information to the traffic display, which relays it to the centralized traffic control station through the interface.

12. The electronic traffic alert system of claim 1 wherein once the traffic display receives the emergency-related information and displays the graphic, the camera unit transmits the emergency-related information and an image of the traffic display to the centralized traffic control station.

13. The electronic traffic alert system of claim 1 wherein multiple traffic displays and multiple camera units identify multiple individual vehicles according to their directions of travel over a predetermined area.

14. The electronic traffic alert system of claim 1 further comprising a light assembly, wherein the traffic display is mounted above a street sign and illuminates the street sign.

15. The electronic traffic alert system of claim 14 wherein the light assembly comprises LED bars attached to the back of the traffic display, using an adjustable attachment which allows the distance between the LEI) bars to be adjusted.

16. The electronic traffic alert system of claim 1, further comprising a solar light assembly unit for mounting and powering a light assembly.

17. The electronic traffic alert system of claim 1 wherein the camera unit includes a memory storage for storing images captured by the camera unit.

18. The electronic traffic alert system of claim 1 wherein the camera unit is affixed to a street lamp across an intersection from the traffic display.

19. The electronic traffic alert system of claim 18 wherein multiple camera units are affixed across an intersection from traffic displays in all traffic directions approaching the intersection.

20. The electronic traffic alert system of claim 1 wherein the camera unit transfers images from the traffic display to the centralized traffic control station in real time.

* * * * *